United States Patent
Klasen-Memmer et al.

(10) Patent No.: US 7,854,970 B2
(45) Date of Patent: Dec. 21, 2010

(54) LIQUID-CRYSTALLINE MEDIUM

(75) Inventors: Melanie Klasen-Memmer, Heuchelheim (DE); Axel Jansen, Darmstadt (DE); Izumi Saito, Darmstadt (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 55 days.

(21) Appl. No.: 12/202,764

(22) Filed: Sep. 2, 2008

(65) Prior Publication Data

US 2010/0051864 A1  Mar. 4, 2010

(30) Foreign Application Priority Data

Aug. 30, 2007  (DE) .................. 10 2007 041 246

(51) Int. Cl.
*C09K 19/34* (2006.01)
*C09K 19/30* (2006.01)
*C09K 19/12* (2006.01)

(52) U.S. Cl. .............. 428/1.1; 252/299.01; 252/299.61; 252/299.63; 252/299.66

(58) Field of Classification Search .................. 428/1.1; 252/299.01, 299.61, 299.63, 299.66
See application file for complete search history.

(56) References Cited

FOREIGN PATENT DOCUMENTS

| | | |
|---|---|---|
| CN | 1844310 A | 10/2006 |
| DE | 39 06 058 C2 | 9/1989 |

*Primary Examiner*—Shean C Wu
(74) *Attorney, Agent, or Firm*—Millen, White, Zelano & Branigan, P.C.

(57) ABSTRACT

Disclosed are a liquid-crystalline medium based on a mixture of polar compounds which contain at least one compound of formula I

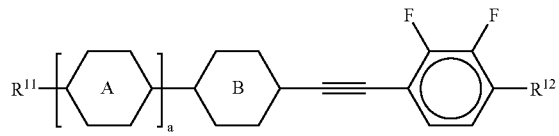

and the use thereof for a passive-matrix or active-matrix display based on the ECB, FFS, PALC or IPS effect.

18 Claims, No Drawings

LIQUID-CRYSTALLINE MEDIUM

The invention relates to a liquid-crystalline medium based on a mixture of polar compounds which comprises at least one compound of the formula I

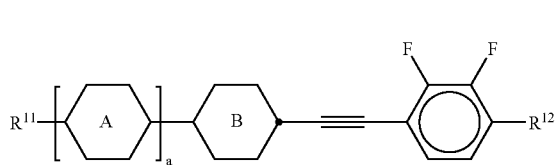

in which $R^{11}$ and $R^{12}$ each, independently of one another, denote an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

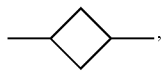

—C≡C—, —$CF_2$O—, —OC—O— or —O—CO— in such a way that O atoms are not linked directly to one another,

each, independently of one another, denote

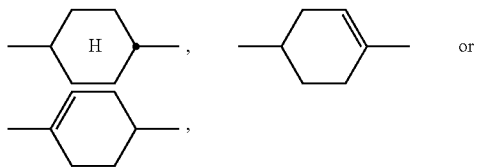

a denotes 0, 1 or 2.

Media of this type can be used, in particular, for electro-optical displays having active-matrix addressing based on the ECB effect and for IPS (in-plane switching) and FFS (fringe field switching) displays. The medium according to the invention preferably has negative dielectric anisotropy.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy Δn and values for the dielectric anisotropy of Δε≦−0.5 in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs...", SID 2004 International Symposium, Digest of Technical Papers, XXXV, Book I, pp. 6 to 9, and Liu, C. T. et al., paper 15.1: "A 46-inch TFT-LCD HDTV Technology...", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Like ASV displays, ECB displays use liquid-crystalline media of negative dielectric anisotropy (Δε), whereas TN displays and all conventional IPS displays to date use liquid-crystalline media of positive dielectric anisotropy.

In liquid-crystal displays of this type, the liquid crystals are used as dielectrics, the optical properties of which change reversibly on application of an electrical voltage.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

In particular, the response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications, and it therefore appears desirable to find further optimisation approaches.

None of the hitherto-disclosed series of compounds having a liquid-crystal-line mesophase includes a single compound which meets all these requirements. Mixtures of 2 to 25, preferably 3 to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Since in displays in general, i.e. also in displays in accordance with these mentioned effects, the operating voltage should be as low as possible, use is made of liquid-crystal media which are generally predominantly composed of liquid-crystal compounds which all have the same sign of the dielectric anisotropy and have the highest possible value of the dielectric anisotropy. In general, use is made of at most relatively small amounts of neutral compounds and as far as possible no compounds having the opposite sign of the dielectric anisotropy to the medium. In the case of the liquid-crystal media of negative dielectric anisotropy for ECB displays, use is thus predominantly made of compounds of negative dielectric anisotropy. The liquid-crystal media employed generally consist of ≧40% by weight of liquid-crystal compounds of negative dielectric anisotropy.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays disclosed hitherto usually operate as TN cells with crossed polarisers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a large working-temperature range, short response times and a low threshold voltage with the aid of which various grey shades can be produced.

The invention is based on the object of providing MLC displays, not only for monitor and TV applications, but also for mobile telephones and navigation systems, which are based on the ECB, PALC, FFS or IPS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has now been found that this object can be achieved if nematic liquid-crystal mixtures which comprise at least one compound of the formula I are used in these display elements. These liquid-crystal mixtures are distinguished by high values for the birefringence ($\Delta n$) and are therefore eminently suitable, inter alia, for screens of television sets, computers, such as, for example, notebooks or desktops, switchboards, but also of gambling machines, electro-optical displays, such as, for example, watches, calculators, pocket electronic games, chess computers, portable data storage devices, such as PDAs (personal digital assistants), or of mobile telephones and navigation equipment, in particular for all displays on which moving images are displayed.

The invention thus relates to a liquid-crystalline medium based on a mixture of polar compounds which comprises at least one compound of the formula I.

By polar compounds applicants mean polar, mesogenic compounds, which exhibit a dielectric anisitropy, preferably having a negative dielectric anisotropy. For example, polar compounds are those which have an absolute value for Delta epsilon of 1.5 or greater, preferably of 3.0 or greater, meaning a Delta epsilon of −1.5 or less, preferably of −3.0 or less. Preferred ranges for the absolute values of Dela epsilon are those encompassing the absolute values of Delta epsilon of the exemplified embodiments of this application, e.g., an absolute value in the range of 2.5 to 5.0.

The mixtures according to the invention exhibit very broad nematic phase ranges with clearing points ≧65° C., very favourable values for the capacitive threshold, relatively high values for the holding ratio and at the same time very good low-temperature stabilities at −30° C. and −40° C. The mixtures according to the invention are furthermore distinguished by low rotational viscosities $\gamma_1$.

Some compounds of formula I may be derived from CN 18 44 310 A or DE 39 06 058 C2. These references are incorporated herein by reference for their disclosures of compounds, both broadly and more specifically, which compounds may possibly be within the scope of the compounds of formula I herein, e.g., for support for the exclusion thereof from the scope of the present invention.

Some preferred embodiments of the mixtures according to the invention are indicated below:

a) $R^{11}$ and $R^{12}$ in the compounds of the formula I preferably denote alkyl and/or alkenyl having up to 6 C atoms, in particular straight-chain alkyl, vinyl, 1E-alkenyl or 3-alkenyl, very particularly preferably a straight-chain unsubstituted alkyl radical having 1-6 C atoms, preferably 2-5 C atoms.

If $R^{11}$ and/or $R^{12}$ denote alkyl, the alkyl radicals may be identical or different. If $R^{11}$ and/or $R^{12}$ denote an alkyl radical, it is preferably $CH_3$, $C_2H_5$, n-$C_3H_7$, n-$C_4H_9$, n-$C_5H_{11}$, furthermore n-$C_6H_{13}$.

If $R^{11}$ and/or $R^{12}$ denote alkenyl, the alkenyl radicals may be identical or different. If $R^{11}$ and/or $R^{12}$ denote an alkenyl radical, it is preferably $CH_2$=CH, $CH_3$—CH=CH, $C_3H_7$—CH=CH, $CH_2$=CH—$C_2H_4$ or $CH_3$—CH=CH—$C_2H_4$.

b) In the formula I, the rings A and B preferably denote

furthermore

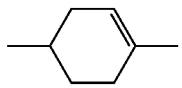 or 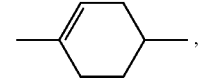, in particular

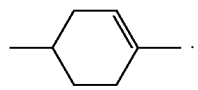

a preferably denotes 0 or 1. In the case of a=1, the rings A and B may be identical or different. The ring A preferably denotes

if a=0. The rings A and B preferably both denote

if a=1.

c) Liquid-crystalline medium which comprises one, two, three, four or more, preferably one, two or three, compounds of the formula I.

d) Liquid-crystalline medium in which the proportion of compounds of the formula I in the mixture as a whole is at least 2% by weight, preferably at least 10% by weight, particularly preferably 2-60%.

e) Liquid-crystalline medium which comprises at least one compound selected from the sub-formulae I1 to I24

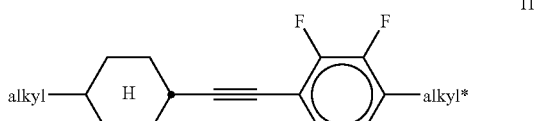

I1

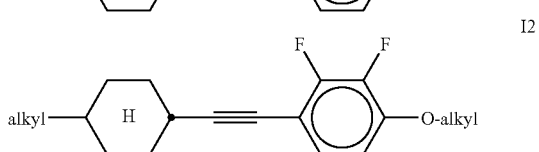

I2

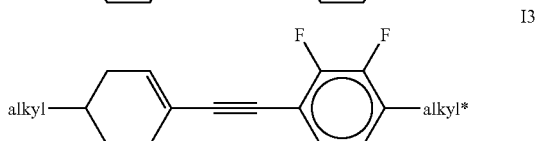

I3

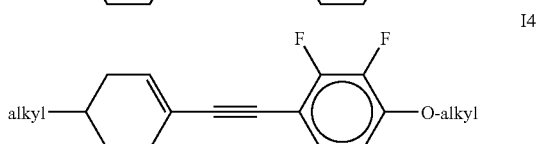

I4

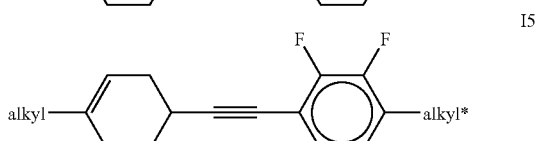

I5

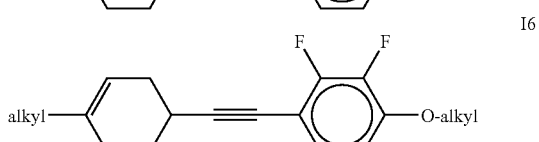

I6

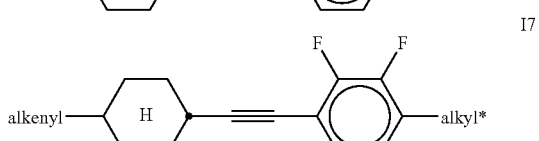

I7

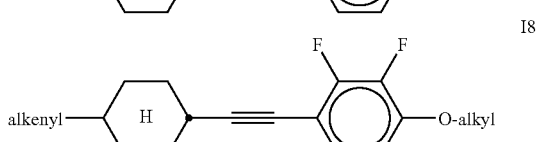

I8

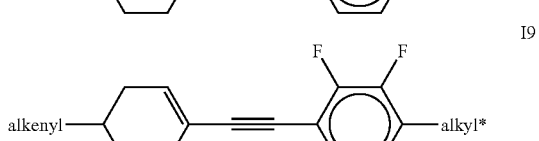

I9

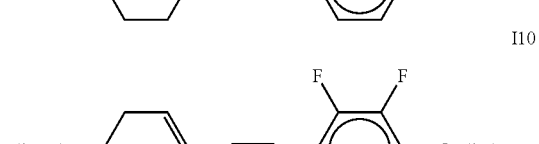

I10

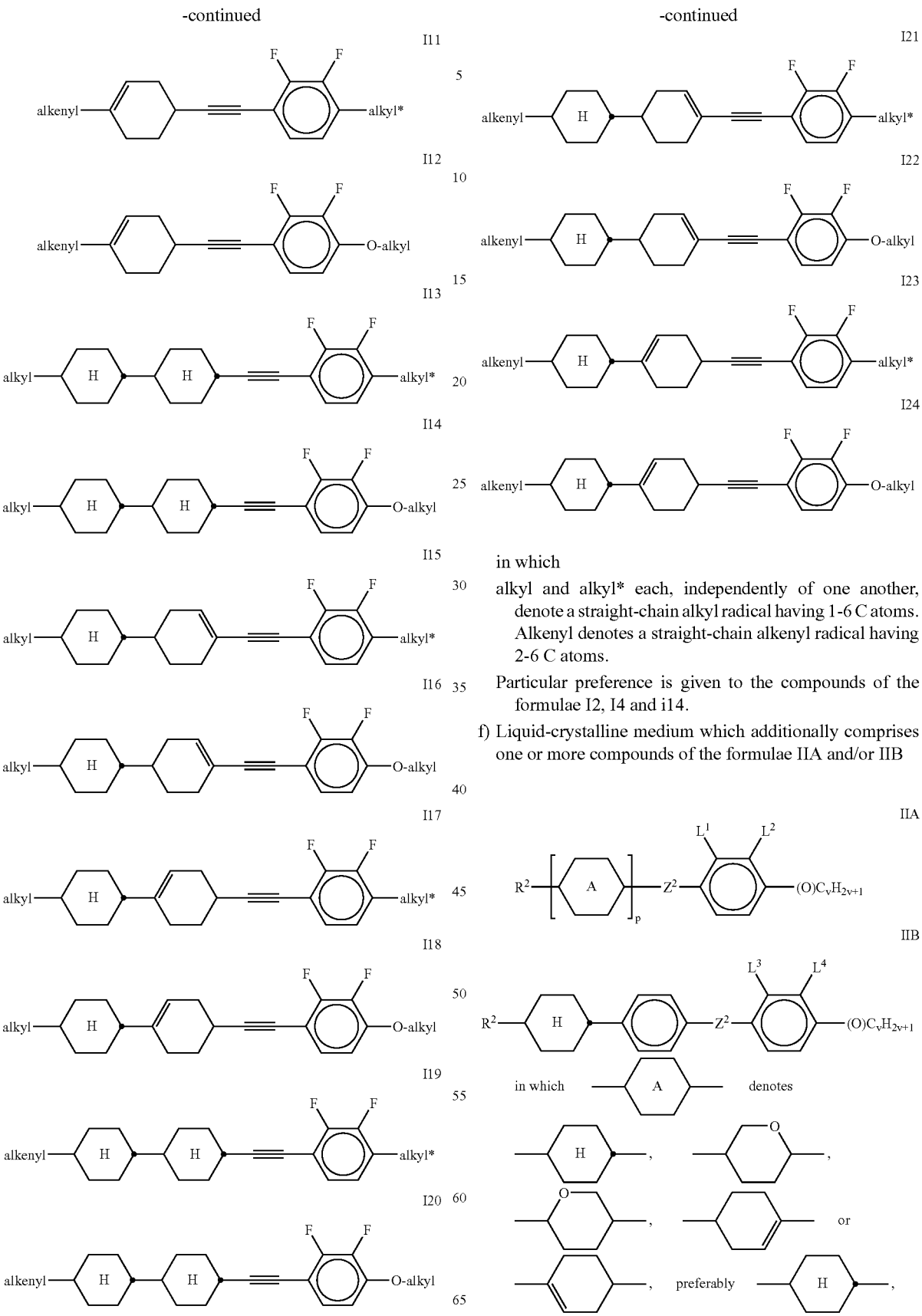

in which
alkyl and alkyl* each, independently of one another, denote a straight-chain alkyl radical having 1-6 C atoms. Alkenyl denotes a straight-chain alkenyl radical having 2-6 C atoms.

Particular preference is given to the compounds of the formulae I2, I4 and i14.

f) Liquid-crystalline medium which additionally comprises one or more compounds of the formulae IIA and/or IIB $R^2$ has the meaning of $R^{11}$, $Z^2$ denotes a single bond, —CH=CH—, —CH$_2$O—, —OCH$_2$—, —CF$_2$O—, —OCF$_2$—, —O—, —CH$_2$— or —CH$_2$CH$_2$—, preferably a single bond, p denotes 1 or 2, and $L^{1-4}$ each, independently of one another, denote F, Cl, OCF$_3$, CF$_3$, CH$_3$, CH$_2$F, CHF$_2$, preferably $L^1=L^2=$F or $L^3=L^4=$F, v denotes 1 to 6.

The meanings of $R^2$, $Z^2$ and v in the compounds of the formulae IIA and IIB may be identical or different.

Particularly preferred compounds of the formula IIA are the compounds of the formulae IIA-1 to IIA-23

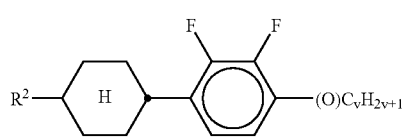
IIA-1

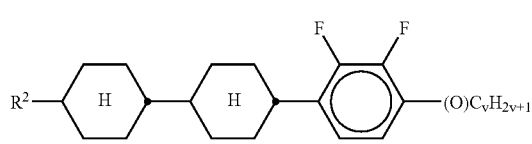
IIA-2

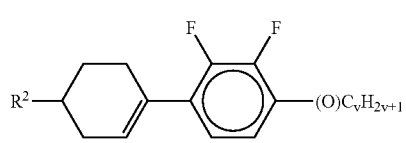
IIA-3

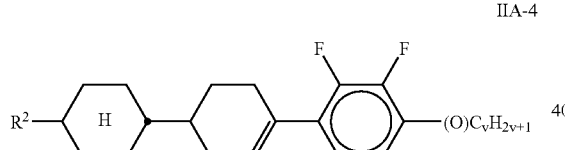
IIA-4

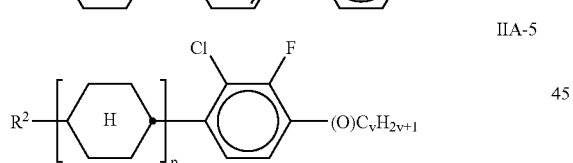
IIA-5

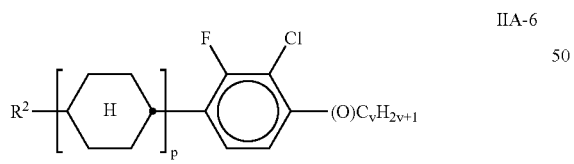
IIA-6

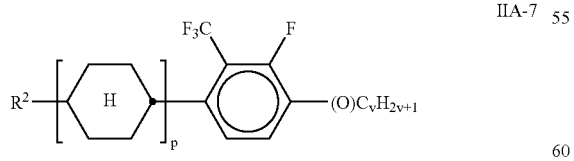
IIA-7

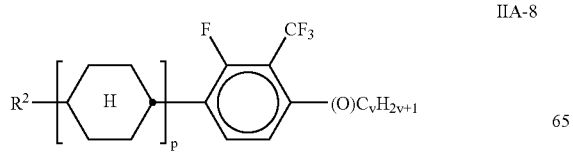
IIA-8

-continued

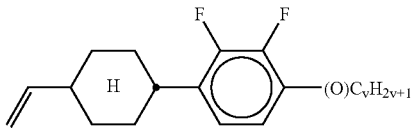
IIA-9

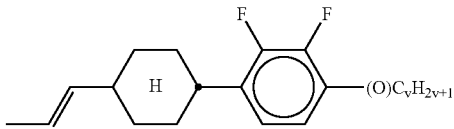
IIA-10

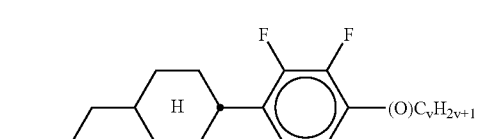
IIA-11

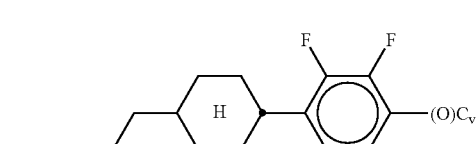
IIA-12

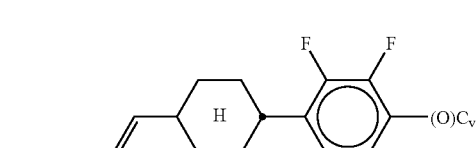
IIA-13

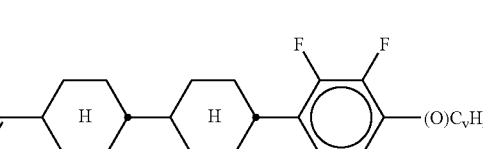
IIA-14

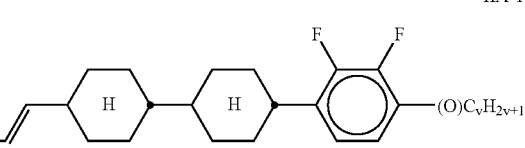
IIA-15

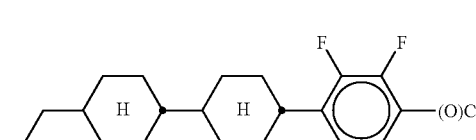
IIA-16

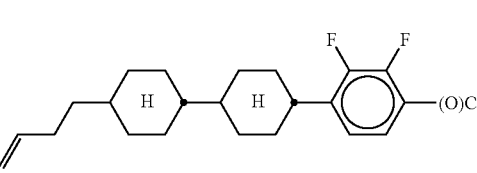
IIA-17

-continued

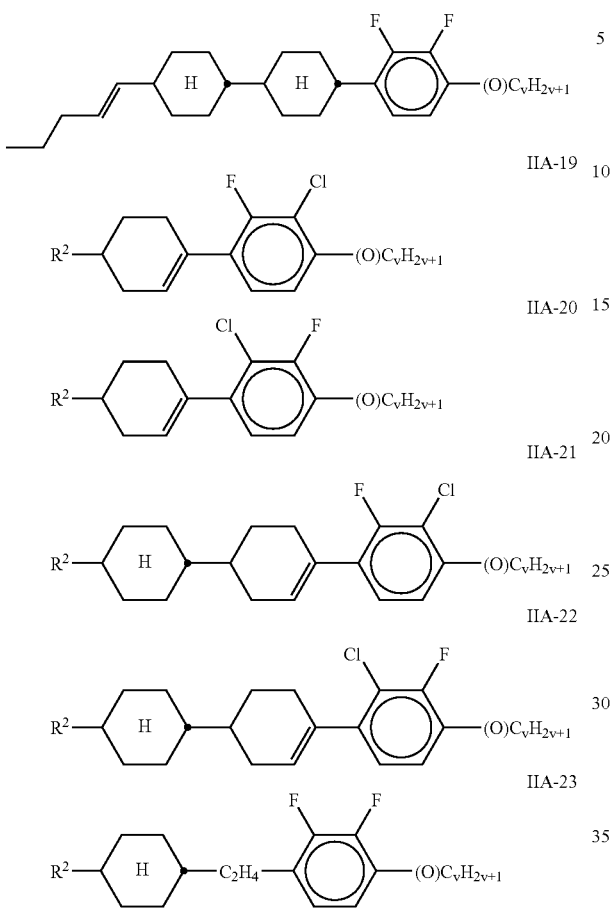

in which $R^2$ and v have the meanings indicated above, and $(O)C_vH_{2v+1}$ denotes $C_vH_{2v+1}$ or $OC_vH_{2v+1}$.

Particular preference is given to the compounds of the formulae IIA-1 and IIA-2, furthermore IIA-3 and IIA-4. In the compounds of the formula IIA, $R^2$ preferably denotes straight-chain alkyl or alkenyl, in particular $CH_2\!=\!CH$, $CH_3CH\!=\!CH$, $CH_2\!=\!CHCH_2CH_2$, $CH_3CH\!=\!CHC_2H_4$, $C_3H_7CH\!=\!CH$, $CH_3$, $C_2H_5$, n-$C_3H_7$, n-$C_4H_9$, n-$C_5H_{11}$.

Particularly preferred compounds of the formula IIB are the compounds of the formulae IIB-1 to IIB-7

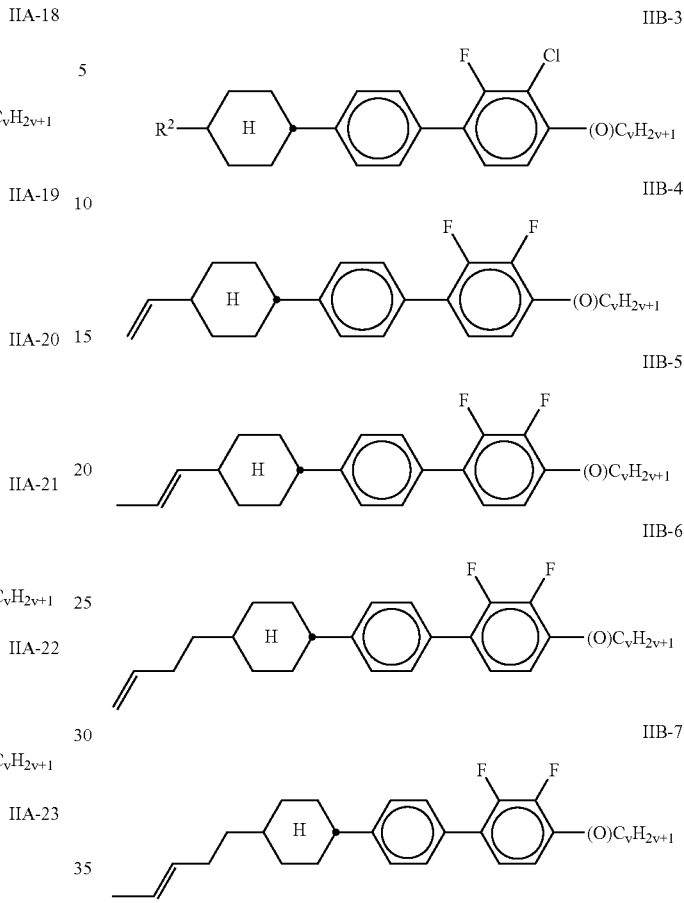

in which $R^2$ and v have the meanings indicated above.

Particular preference is given to the compounds of the formula IIB-1. In the compounds of the formula IIB-1, $R^2$ preferably denotes straight-chain alkyl or alkenyl, in particular $CH_2\!=\!CH$, $CH_3CH\!=\!CH$, $CH_2\!=\!CHCH_2CH_2$, $CH_3CH\!=\!CHC_2H_4$, $C_3H_7CH\!=\!CH$, $CH_3$, $C_2H_5$, n-$C_3H_7$, n-$C_4H_9$, n-$C_5H_{11}$.

In the compounds of the formulae IIA and IIB, $Z^2$ preferably denotes a single bond, furthermore —$CH_2CH_2$—.

g) Liquid-crystalline medium which additionally comprises one or more compounds of the formula III

in which $R^{31}$ and $R^{32}$ each, independently of one another, denote an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

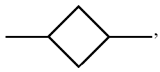

—C≡C—, —OC—O— or —O—CO— in such a way that O atoms are not linked directly to one another, preferably straight-chain alkyl, preferably having 1 to 12 C atoms,

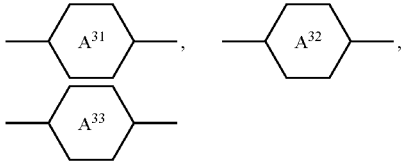

each, independently of one another, denote

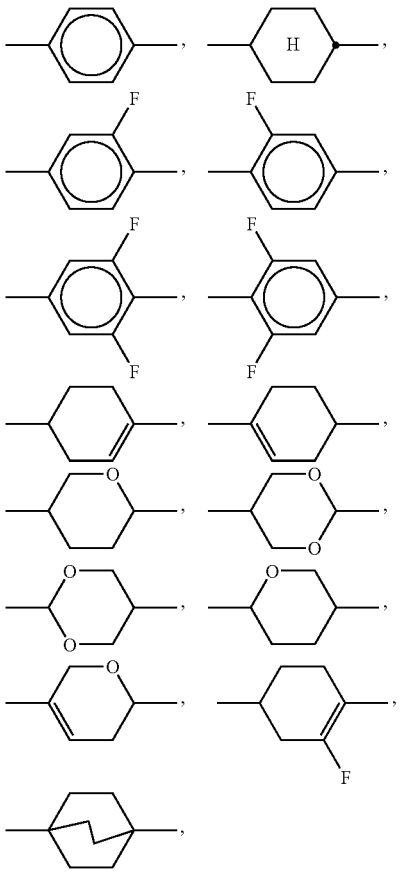

r denotes 0, 1 or 2, $Z^{31}$ and $Z^{32}$ each, independently of one another, denote a single bond, —CH$_2$CH$_2$—, —C≡C—, —CH=CH—, —CF$_2$O—, —OCF$_2$—, —CF=CF—, —CF=CH—, —CH=CF—, —CH$_2$CF$_2$—, —CF$_2$CH$_2$—, —COO—, —OCO—, —CH$_2$O—, —OCH$_2$—, —(CH$_2$)$_4$—.

h) Liquid-crystalline medium in which the proportion of compounds of the formulae IIA and/or IIB in the mixture as a whole is at least 20% by weight.

i) Liquid-crystalline medium in which the proportion of the compounds of the formula III in the mixture as a whole is at least 5% by weight.

j) Liquid-crystalline medium which additionally comprises one or more compounds selected from the formulae IIIa to IIIp

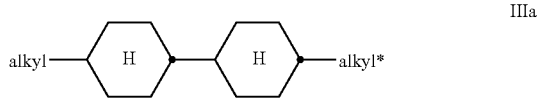

IIIa

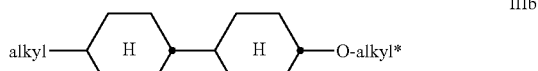

IIIb

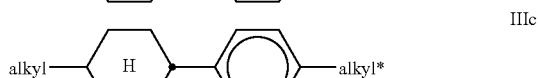

IIIc

IIId

IIIe

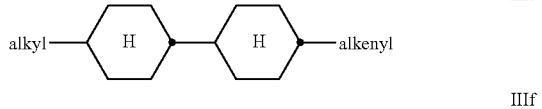

IIIf

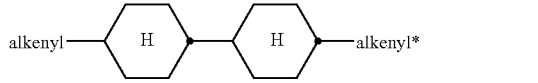

IIIg

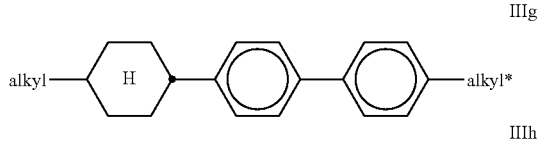

IIIh

IIIi

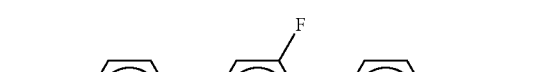

IIIj

IIIk

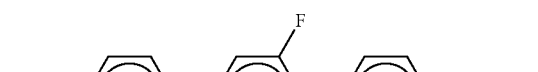

IIIl

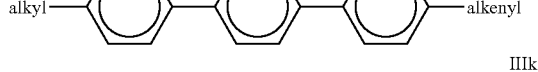
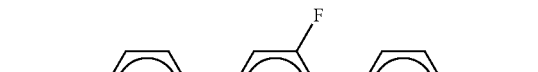

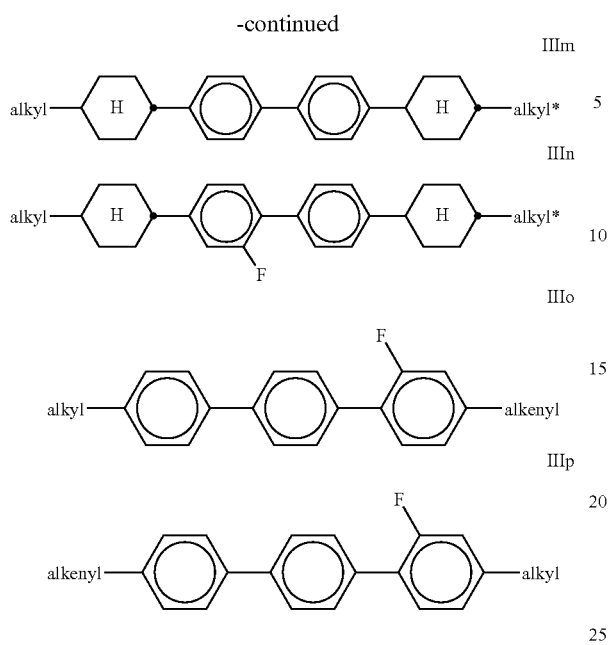

in which
alkyl and
alkyl* each, independently of one another, denote a straight-chain alkyl radical having 1-6 C atoms,
alkoxy denotes a straight-chain alkoxy radical having 1-6 C atoms,
alkenyl and
alkenyl* each, independently of one another, denote a straight-chain alkenyl radical having 2-6 C atoms.

The proportion of compounds of the formula III in the mixture as a whole is preferably at least 5% by weight.

The medium according to the invention particularly preferably comprises compounds of the formula IIIe in amounts of >20% by weight, in particular >25% by weight, very particularly preferably >30% by weight, in particular compounds selected from the compounds of the formula

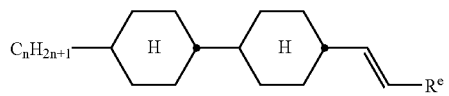

in which
n=3, 4, 5, and $R^e$ denotes H or $CH_3$.

The medium according to the invention preferably comprises at least one compound of the formulae IIIa, IIIb, IIIe, IIIf, IIIi, IIIj, IIIk, IIIl, IIIm, IIIn and/or IIIo.

Particularly preferred compounds of the formulae IIIe and IIIf are indicated below:

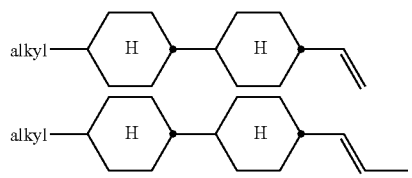

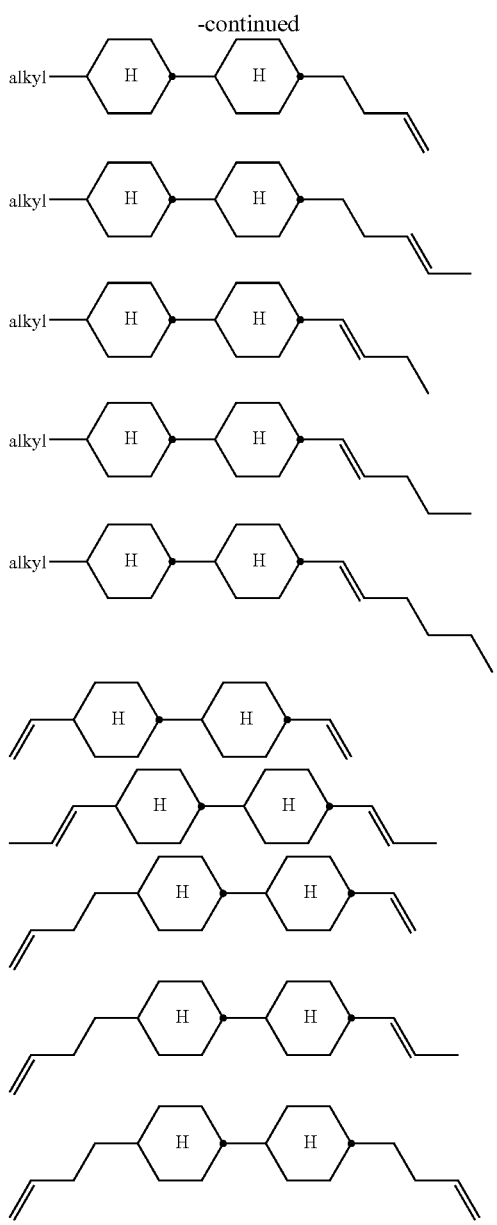

In the compounds of the formula III, $R^{31}$ and $R^{32}$ each, independently of one another, preferably denote straight-chain alkyl, alkoxy or alkenyl, each having up to 6 C atoms. $Z^{31}$ and $Z^{32}$ preferably, independently of one another, denote a single bond, furthermore —COO— or —$CH_2O$—. The rings $A^{31}$, $A^{32}$, $A^{33}$ preferably each, independently of one another, denote

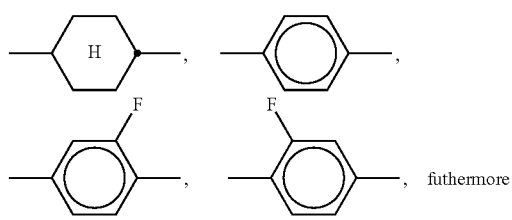

furthermore

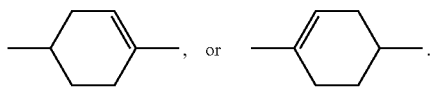, or k) Liquid-crystalline medium which comprises or consists of
   2-20% by weight of one or more compounds of the formula I and
   20-80% by weight of one or more compounds of the formulae IIA and/or IIB,
   where the total concentration is max. 100%, based on the mixture.

l) Liquid-crystalline medium which additionally comprises one or more tetracyclic compounds of the formulae

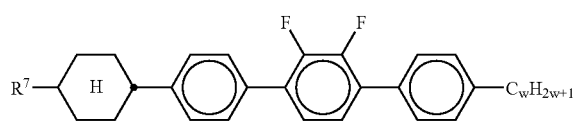

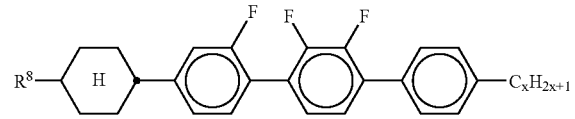

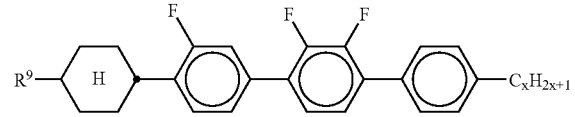

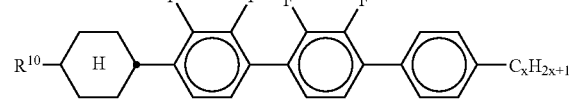

in which
$R^{7-10}$ each, independently of one another, have one of the meanings indicated for $R^{11}$ in claim 1, and
w and x each, independently of one another, denote 1 to 6.

m) Liquid-crystalline medium which additionally comprises one or more compounds of the formulae Y-1 to Y-14

Y-1
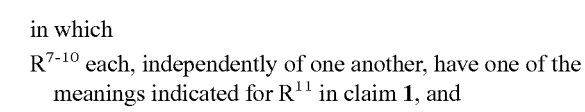

Y-2
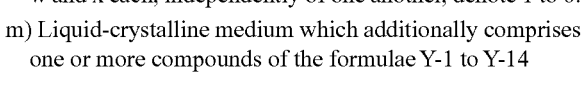

Y-3
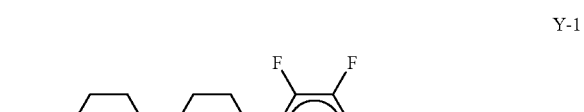

Y-4
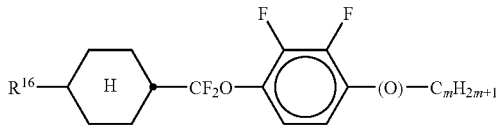

Y-5
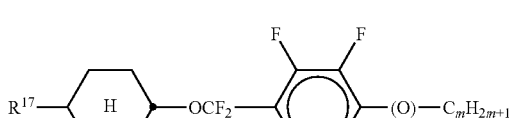

Y-6
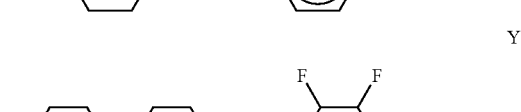

Y-7
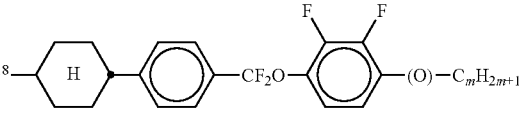

Y-8
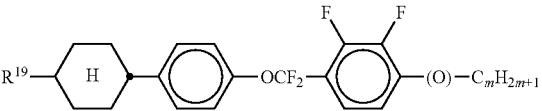

Y-9
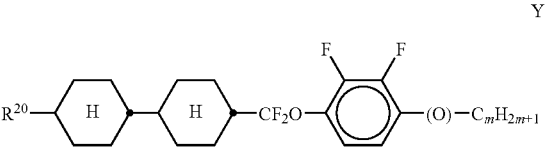

Y-10
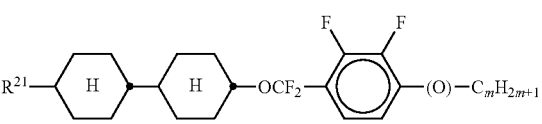

Y-11
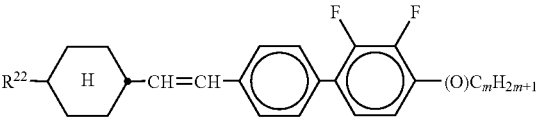

Y-12
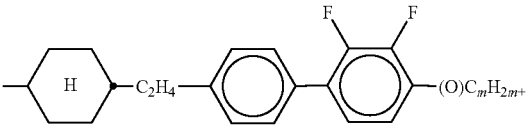

Y-13
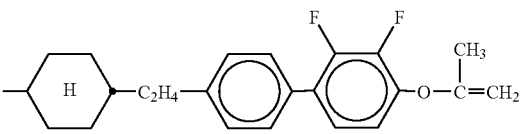

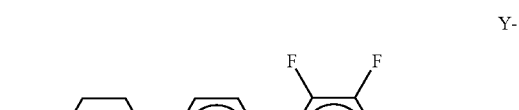

-continued

Y-14
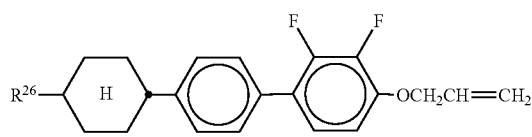

in which $R^{13}$-$R^{26}$ each, independently of one another, have the meanings indicated for $R^{11}$, and z and m each, independently of one another, denote 1-6, and (O)$C_mH_{2m+1}$ denotes either $C_mH_{2m+1}$ or $OC_mH_{2m+1}$.

n) Liquid-crystalline medium which additionally comprises one or more compounds of the formula B-1

B-1
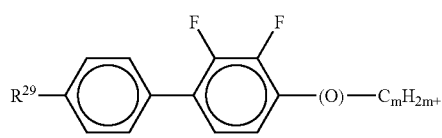

preferably in amounts of >3% by weight, in particular ≧5% by weight, and very particularly preferably 5-25% by weight,
where
$R^{29}$ has the meanings indicated for $R^{11}$, and m denotes 1-6.

o) Liquid-crystalline medium additionally comprising one or more compounds of the formulae T-1 to T-21

T-1
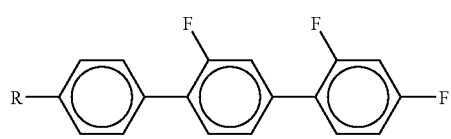

T-2
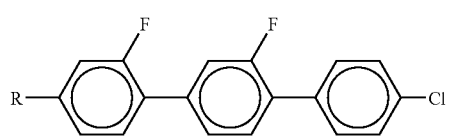

T-3
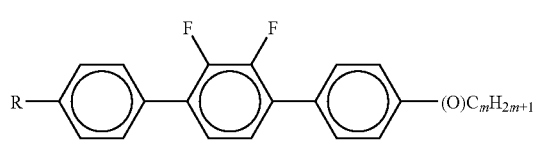

T-4
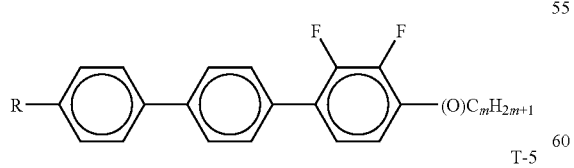

T-5
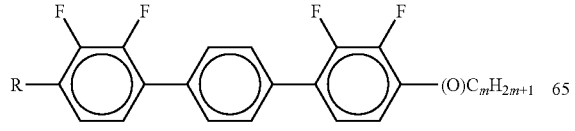

T-6
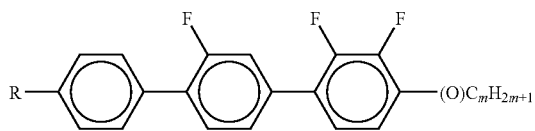

T-7
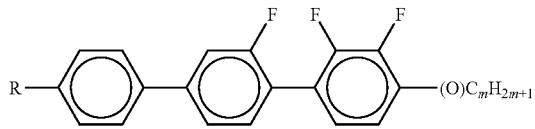

T-8
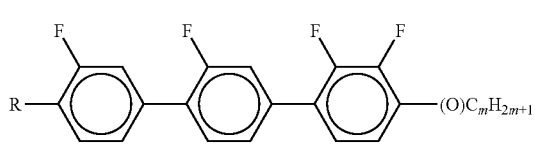

T-9
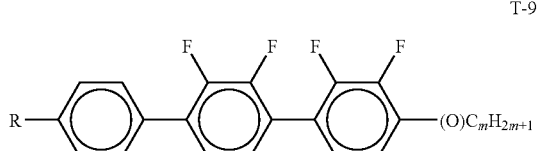

T-10
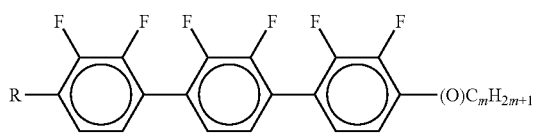

T-11
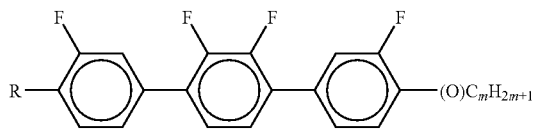

T-12
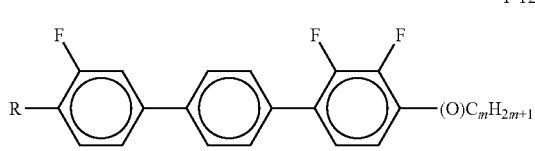

T-13
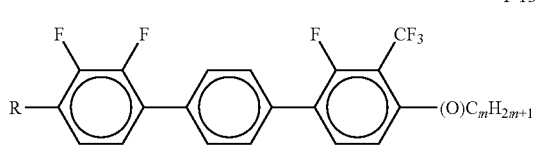

T-14
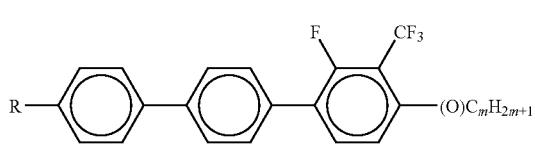

T-15
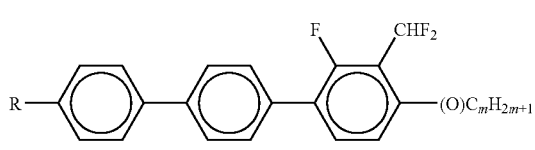

-continued

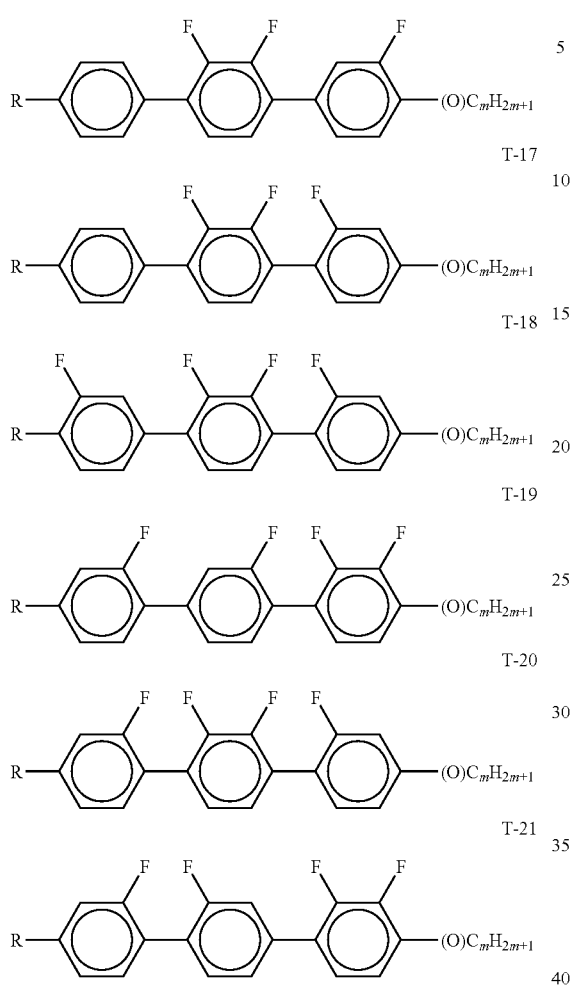

in which R denotes a straight-chain alkyl, alkenyl, alkoxy, alkylalkoxy or alkenyloxy radical having 1 or 2 to 6 C atoms respectively, and m is 1-6.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-22 in amounts of 2-30% by weight, in particular 5-20% by weight.

Particular preference is given to the compounds of the formulae T-1, T-2, T-3, T-4 and T-22. In these compounds, R preferably denotes alkyl, furthermore alkoxy, each having 1-5 C atoms.

Particularly preferred media according to the invention comprise a compound of the formula

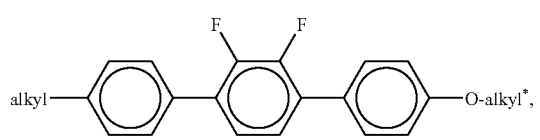

in which
alkyl and O-alkyl* have the meanings indicated above.

The terphenyls are preferably employed in the mixtures according to the invention if the Δn value of the mixture is intended to be ≧0.1. Preferred mixtures comprise 2-20% by weight of one or more terphenyl compounds selected from the group of the compounds T-1 to T-21.

p) Liquid-crystalline medium additionally comprising one or more bi-phenyls of the formulae B-1 to B-3

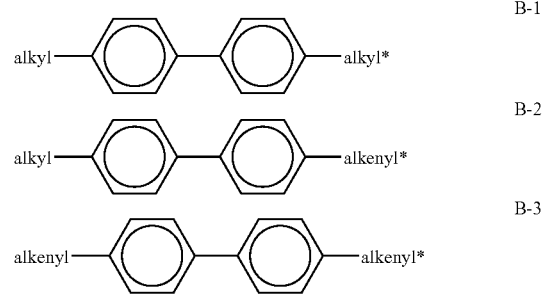

in which
alkyl and alkyl* each, independently of one another, denote a straight-chain alkyl radical having 1-6 C atoms, and alkenyl and
alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≧5% by weight.

Of the compounds of the formulae B-1 to B-3, the compounds of the formula B-2 are particularly preferred.

Particularly preferred biphenyls are

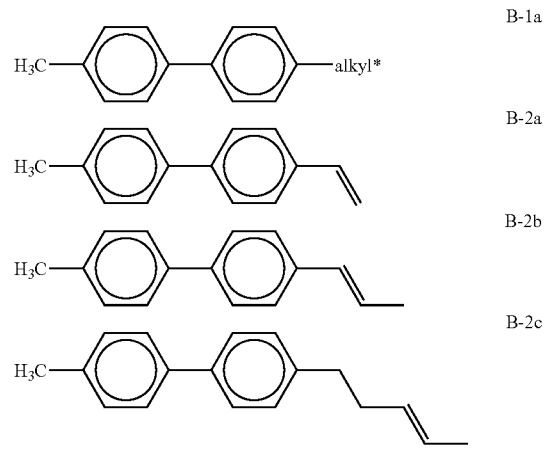

in which alkyl* denotes an alkyl radical having 1-6 C atoms. The medium according to the invention particularly preferably comprises one or more compounds of the formulae B-1a and/or B-2c.

q) Liquid-crystalline medium additionally comprising at least one compound of the formulae Z-1 to Z-15

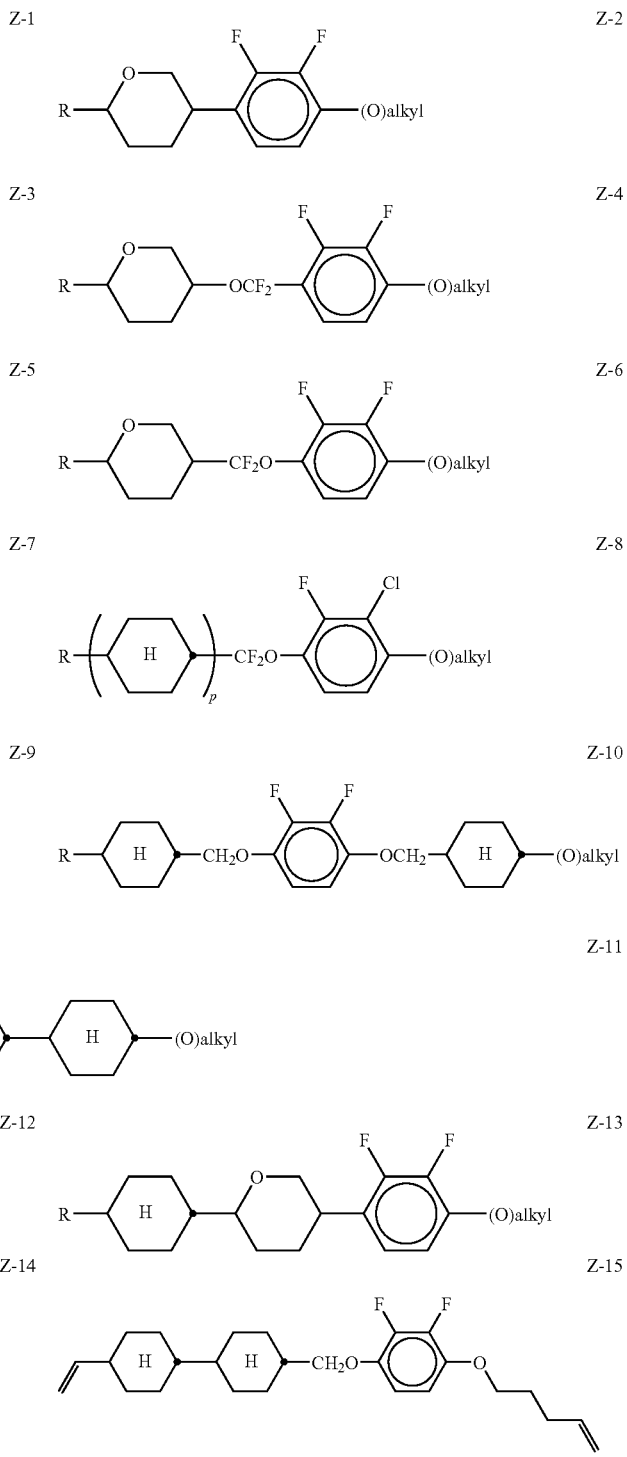
in which
alkyl has the meanings indicated above, and R denotes a straight-chain alkyl, alkoxy or alkenyl radical having 1 or 2 to 7 C atoms respectively.
r) Liquid-crystalline medium comprising at least one compound of the formulae O-1 to O-14
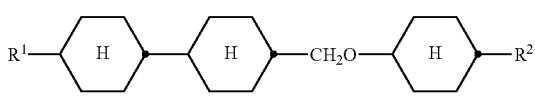
O-1

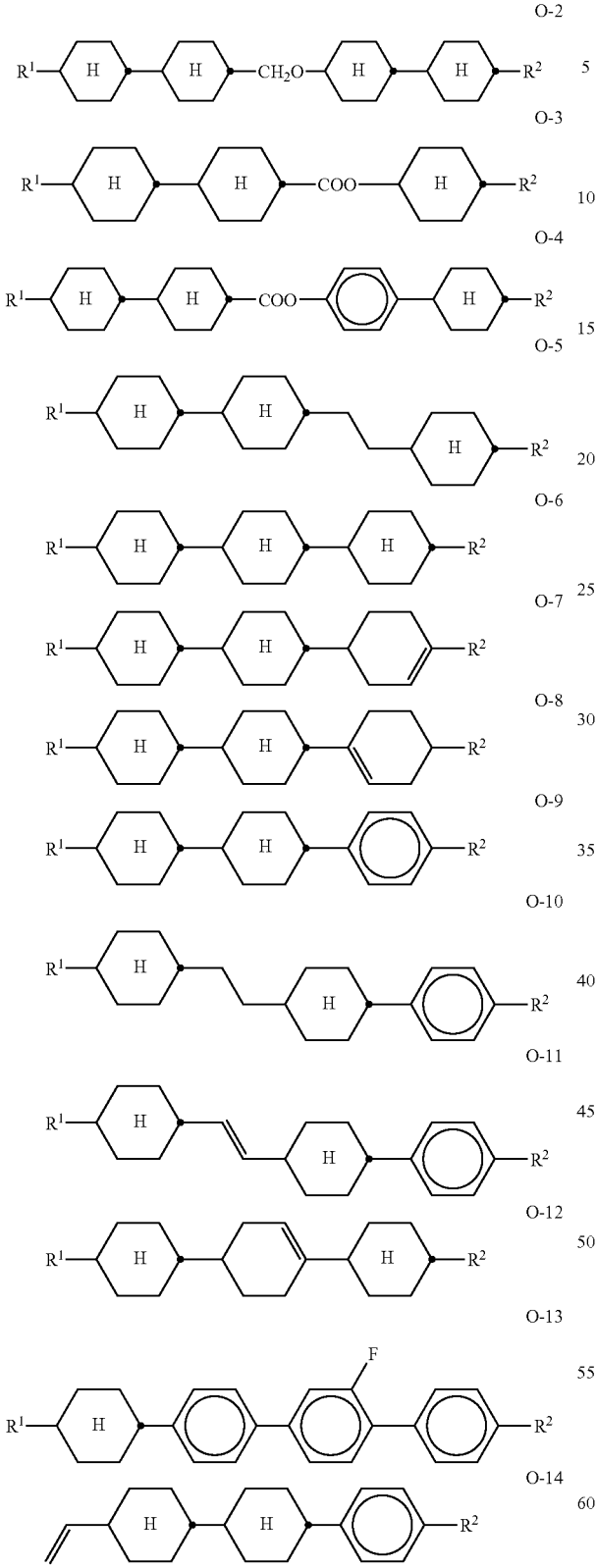

in which $R^1$ and $R^2$ have the meanings indicated for $R^{11}$, $R^1$ and $R^2$ preferably each, independently of one another, denote straight-chain alkyl, furthermore alkenyl.

Preferred media comprise one or more compounds of the formulae O-1, O-3, O-4, O-9, O-13 and/or O-14.

The proportion of compounds O-1 to O-14 in the mixture is preferably 5-40% by weight.

The compound of the formula O-9 is preferably

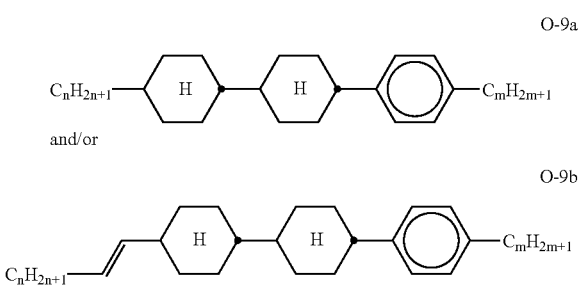

in which n and m each, independently of one another, denote 1, 2, 3, 4 or 5. In the formula O-9b, n preferably denotes 2, and m preferably denotes 1.

Preferred mixtures comprise 2-30% by weight, in particular 5-20% by weight, of the compound of the formula O-9, in particular of the compound of the formula O-9a.

s) Preferred liquid-crystalline media according to the invention comprise one or more substances which contain a tetrahydronaphthyl or naphthyl unit, such as, for example, the compounds of the formulae N-1 to N-6

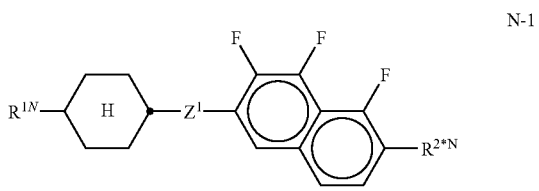

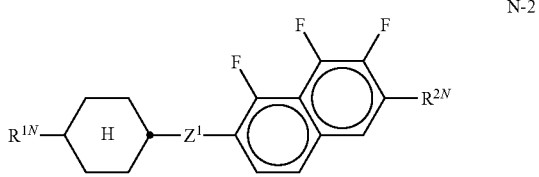

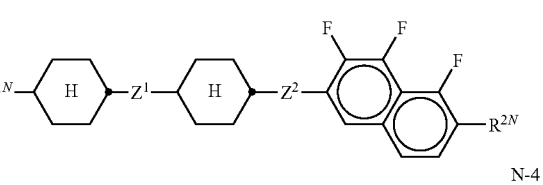

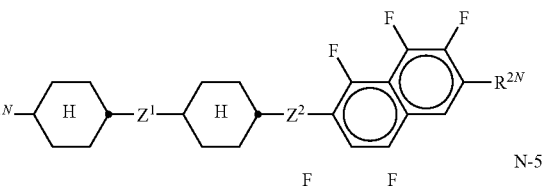

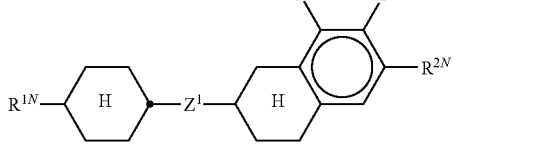

-continued

N-6

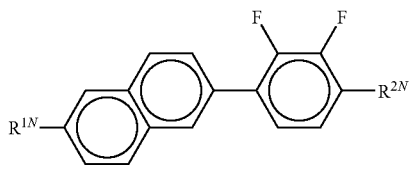

in which $R^{1N}$ and $R^{2N}$ each, independently of one another, have the meanings indicated for $R^{11}$, preferably denote straight-chain alkyl, straight-chain alkoxy or straight-chain alkenyl, and $Z^1$ and $Z^2$ each, independently of one another, denote
—$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

t) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF

BC

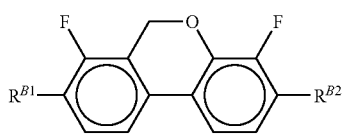

CR

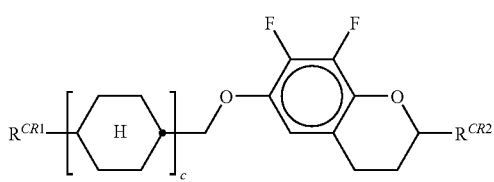

PH-1

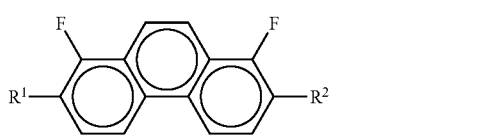

PH-2

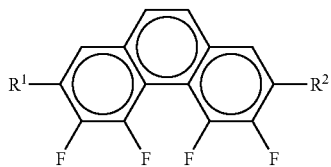

BF

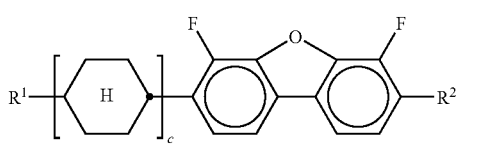

in which
$R^{B1}$, $R^{B2}$, $R^{CR1}$ and $R^{CR2}$ each, independently of one another, have the meaning of $R^{11}$, preferably in amounts of 3 to 20% by weight, in particular in amounts of 3 to 15% by weight.

Particularly preferred compounds of the formulae BC and CR are the compounds BC-1 to BC-7 and CR-1 to CR-5

BC-1

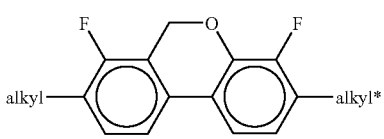

BC-2

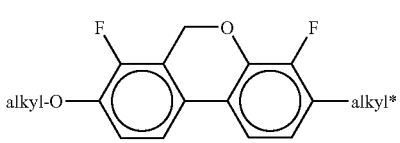

BC-3

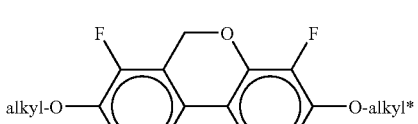

BC-4

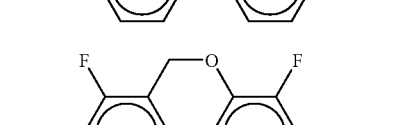

BC-5

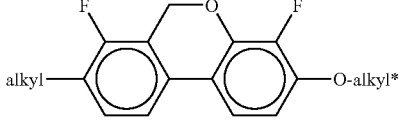

BC-6

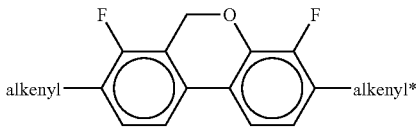

BC-7

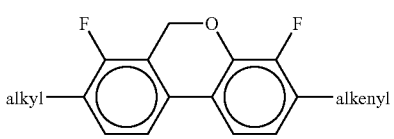

CR-1

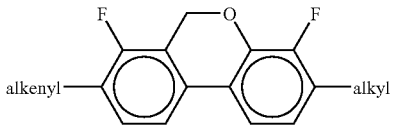

CR-2

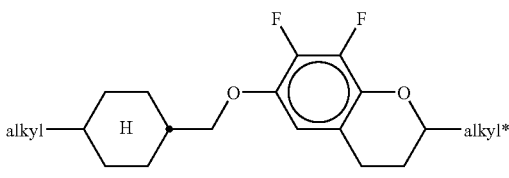

CR-3

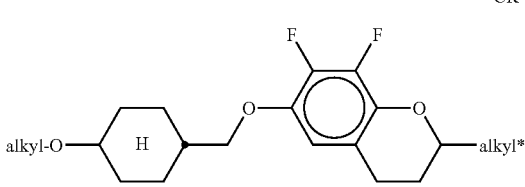

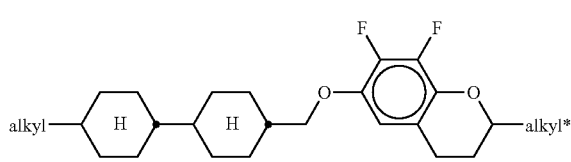

-continued

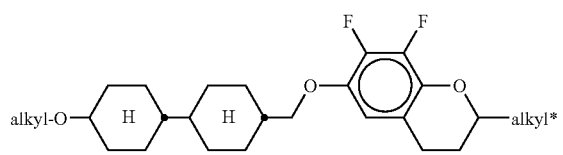
CR-4

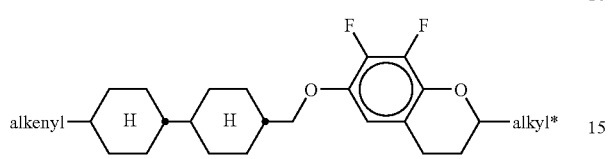
CR-5 in which
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.
Very particular preference is given to mixtures comprising one, two or three compounds of the formula BC-2.

u) Liquid-crystalline medium which additionally comprises one or more compounds of the formula In

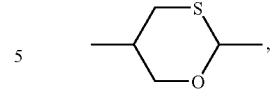

In in which
$R^{1In}$, $R^{2In}$ and $R^{3In}$ each, independently of one another, denote a straight-chain alkyl, alkoxy, alkoxyalkyl or alkenyl radical having 1-5 C atoms,
$R^{2In}$ and $R^{3In}$ additionally denote H or halogen, preferably F,

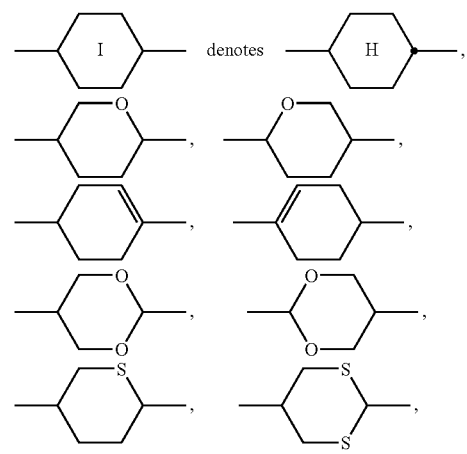

-continued i denotes 0, 1 or 2.

Preferred compounds of the formula In are the compounds of the formulae In-1 to In-24 indicated below:

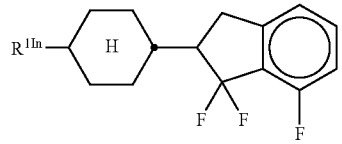
In-1

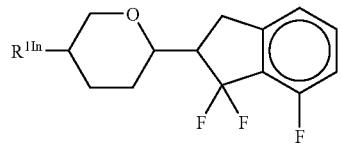
In-2

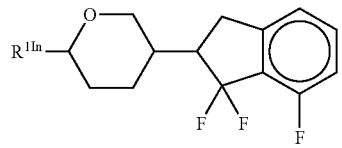
In-3

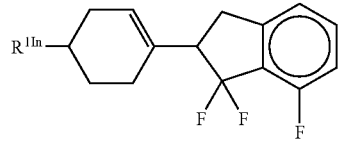
In-4

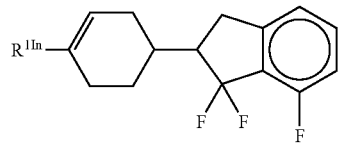
In-5

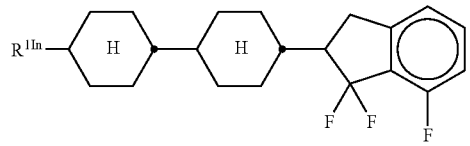
In-6

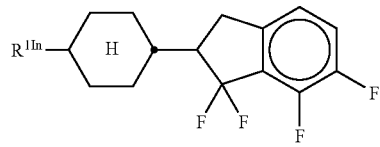
In-7

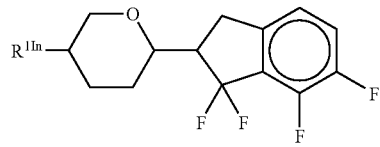
In-8

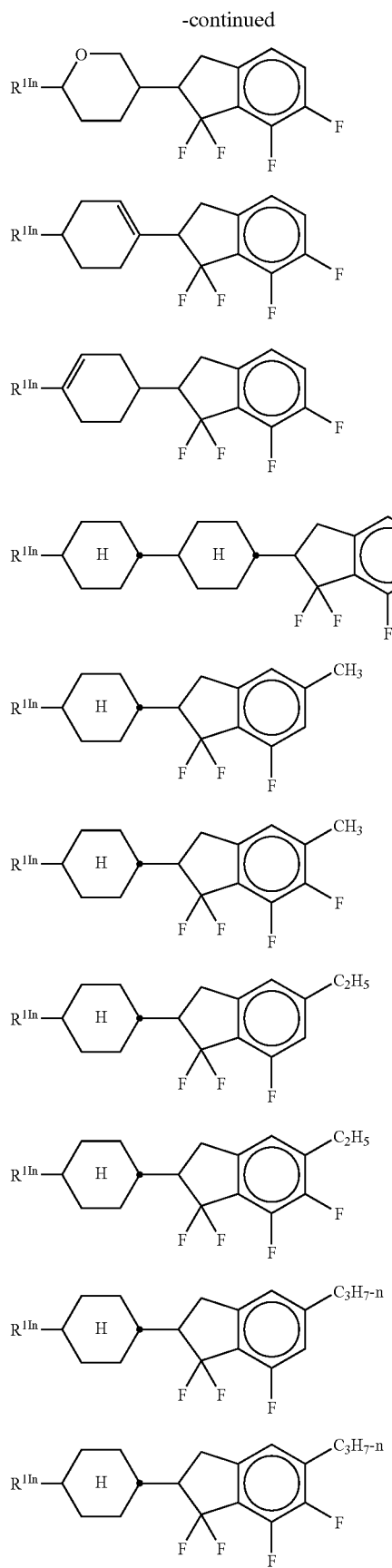

Particular preference is given to the compounds of the formulae In-1, In-3, In-6, In-7 and In-9.

The compounds of the formula In and of the sub-formulae In-1 to In-24 are preferably employed in the mixtures according to the invention in concentrations >5% by weight, in particular 5-30% by weight and very particularly preferably 10-15% by weight.

r) Preferred mixtures comprise one or more compounds of the formulae L-1 to L-10

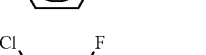

in which

R, $R^1$ and $R^2$ each, independently of one another, have the meanings indicated for $R^{11}$ in claim 1, and alkyl denotes an alkyl radical having 1-6 C atoms.

Particular preference is given to the compounds of the formulae L-1 and L-7.

The compounds of the formulae L-1 to L-10 are preferably employed in concentrations of 10-60% by weight, in particular 10-40% by weight. In a preferred emdobiment, the liquid crystalline medium of the present invention contains at least one compound of formula I as described above, and further contains preferably at least one compound of IIA and/or IIB and/or III.

In a further preferred embodiment of the present invention, compound(s) represented by general formula IE:

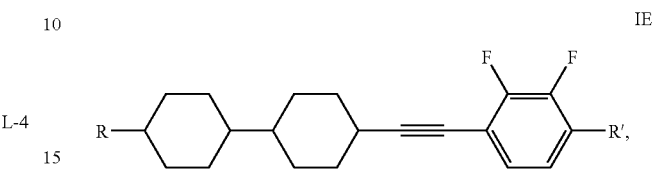

in which R denotes straight chain alkyl group having, up to 10, prefereably 1-9, and more preferably 2-7 carbon atoms and R' denotes alkyl or alkoxy having up to 4, preferably 1-3 carbon atoms, and more preferably are methyl or methoxy, are excluded from the compounds of formula I. The excluded compounds of formula IE have R and R' groups which are not substituted.

In another embodiment, compound(s) represented by general formula IE as above, in which R denotes straight chain alkyl group having 2-7 carbon atoms and R' denotes alkyl or alkoxy having 1 or 2 carbon atoms, are excluded from the compounds of formula I.

In another embodiment, compound(s) represented by general formula IE in which R denotes straight chain alkyl group having 1-9 carbon atoms, and R' denotes alkyl or alkoxy having 1-3 carbon atoms, are excluded from the compounds of formula I.

In yet another embodiment, compounds of formula IE wherein $R'C_2$, $C_3$, $C_4$, $C_5$, or $C_7$ alkyl and R'=$OCH_3$, $OC_2H_5$, $CH_3$, or $C_2H_5$ are excluded, i.e., the excluded compounds are:

4-{2-[trans-4-(trans-4-ethyl cyclohexyl)cyclohexyl]ethynyl}2,3-difluoro anisole;
4-{2-[trans-4-(trans-4-n-propyl cyclohexyl)cyclohexyl]ethynyl}2,3-difluoro anisole;
4-{2-[trans-4-(trans-4-n-butyl cyclohexyl)cyclohexyl]ethynyl}2,3-difluoro anisole;
4-{2-[trans-4-(trans-4-n-pentyl cyclohexyl)cyclohexyl]ethynyl}2,3-difluoro anisole;
4-{2-[trans-4-(trans-4-n-heptyl cyclohexyl)cyclohexyl]ethynyl}2,3-difluoro anisole;
4-{2-[trans-4-(trans-4-ethyl cyclohexyl)cyclohexyl]ethynyl}2,3-difluoro phenetole;
4-{2-[trans-4-(trans-4-n-propyl cyclohexyl)cyclohexyl]ethynyl}2,3-difluoro phenetole;
4-{2-[trans-4-(trans-4-n-butyl cyclohexyl)cyclohexyl]ethynyl}2,3-difluoro phenetole;
4-{2-[trans-4-(trans-4-n-pentyl cyclohexyl)cyclohexyl]ethynyl}2,3-difluoro phenetole;
4-{2-[trans-4-(trans-4-n-heptyl cyclohexyl)cyclohexyl]ethynyl}2,3-difluoro phenetole;
4-{2-[trans-4-(trans-4-ethyl cyclohexyl)cyclohexyl]ethynyl}2,3-difluoro toluene;
4-{2-[trans-4-(trans-4-n-propyl cyclohexyl)cyclohexyl]ethynyl}2,3-difluoro toluene;
4-{2-[trans-4-(trans-4-n-butyl cyclohexyl)cyclohexyl]ethynyl}2,3-difluoro toluene;
4-{2-[trans-4-(trans-4-n-pentyl cyclohexyl)cyclohexyl]ethynyl}2,3-difluoro toluene;
4-{2-[trans-4-(trans-4-n-heptyl cyclohexyl)cyclohexyl]ethynyl}2,3-difluoro toluene;

4-{2-[trans-4-(trans-4-ethyl cyclohexyl)cyclohexyl]ethynyl}2,3-difluoro ethylbenzene;
4-{2-[trans-4-(trans-4-n-propyl cyclohexyl)cyclohexyl]ethynyl}2,3-difluoro ethylbenzene;
4-{2-[trans-4-(trans-4-n-butyl cyclohexyl)cyclohexyl]ethynyl}2,3-difluoro ethylbenzene;
4-{2-[trans-4-(trans-4-n-pentyl cyclohexyl)cyclohexyl]ethynyl}2,3-difluoro ethylbenzene; and
4-{2-[trans-4-(trans-4-n-heptyl cyclohexyl)cyclohexyl]ethynyl}2,3-difluoro ethyl benzene.

The medium containing at least one compound of formula I where formula IE is excluded, may or may not include such co-component(s) as described in the specification, such as compounds of IIA and/or IIB and/or III.

In an embodiment, it preferably contains co-component(s) as described above, preferably at least one compound of IIA and/or IIB and/or III.

In a further embodiment, the medium does not contain compounds of formula IE wherein R denotes straight chain alkyl group having 1-9, and preferably 2-7 carbon atoms and R' denotes acrylic acid or alkoxylation catalyst with 1-3 carbon atoms.

In yet another preferred embodiment, $R^{12}$ denotes an alkyl or alkenyl radical having up to 15 C atoms which is unsubstituted, monosubstituted by CN or $CF_3$ or at least monosubstituted by halogen, in which one or more $CH_2$ groups are optionally replaced by —S—,

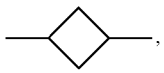

—C≡C—, —$CF_2$O—, —OC—O— in such a way that O atoms are not linked directly to one another.

The invention furthermore relates to an electro-optical display having active-matrix addressing based on the ECB, IPS or FFS effect, characterised in that it contains, as dielectric, a liquid-crystalline medium according to one or more of claims 1 to 10.

The liquid-crystalline medium according to the invention preferably has a nematic phase from ≦−20° C. to ≧70° C., particularly preferably from ≦−30° C. to ≧80° C., very particularly preferably from ≦−40° C. to ≧90° C.

The term "have a nematic phase" here means on the one hand that no smectic phase and no crystallisation are observed at low temperatures at the corresponding temperature and on the other hand that clearing does not occur on heating from the nematic phase. The investigation at low temperatures is carried out in a flow viscometer at the corresponding temperature and is checked by storage in test cells having a layer thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values for the birefringence Δn in the liquid-crystal mixture are generally between 0.07 and 0.16, preferably between 0.08 and 0.12.

The liquid-crystal mixture according to the invention has a Δε of about −0.5 to −8.0, in particular of −3.0 to −6.0, where Δε denotes the dielectric anisotropy. The rotational viscosity $γ_1$ at 20° C. is preferably <165 mPa·s, in particular <140 mPa·s.

The liquid-crystal media according to the invention have relatively low values for the threshold voltage ($V_0$). They are preferably in the range from 1.7 V to 3.0 V, particularly preferably ≦2.75 V and very particularly preferably ≦2.4 V.

For the present invention, the term "threshold voltage" relates to the capacitive threshold ($V_0$), also known as the Freedericksz threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a greater addressing voltage or threshold voltage and vice versa.

For the present invention, the term "dielectrically positive compounds" denotes compounds having a Δε>1.5, the term "dielectrically neutral compounds" denotes those having −1.5≦Δε≦1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and the host mixture used for dielectrically negative compounds is ZLI-2857, both from Merck KGaA, Germany. The values for the respective compounds to be investigated are obtained from the change in the dielectric constants of the host mixture after addition of the compound to be investigated and extrapolation to 100% of the compound employed. 10% of the compound to be investigated are dissolved in the host mixture. If the solubility of the substance is too low for this, the concentration is halved in steps until the investigation can be carried out at the desired temperature.

All temperature values indicated for the present invention are in ° C.

The voltage holding ratio is determined in test cells produced at Merck KGaA. The measurement cells have soda-lime glass substrates and are produced with polyimide alignment layers (AL-3046 from Japan Synthetic Rubber, Japan). The layer thickness is uniformly 6.0 μm. The area of the transparent ITO electrodes is 1 $cm^2$.

The mixtures according to the invention are suitable for all VA-TFT applications, such as, for example, VAN, MVA, (S)-PVA and ASV. They are furthermore suitable for IPS (in-plane switching), FFS (fringe field switching) and PALC applications of negative Δε.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≦−0.5. Besides one or more compounds of the formulae I, it preferably comprises the compounds of the formulae IIA and/or IIB, furthermore compounds of the formula III.

The proportion of component A is preferably between 45 and 100%, in particular between 60 and 100%.

For component A, one (or more) individual compound(s) which has (have) a value of $\Delta\epsilon \leq -0.8$ is (are) preferably selected. This value must be more negative, the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20 C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, and particularly preferably <10, compounds of the formulae I and compounds of the formulae IIA and/or IIB and optionally III.

Besides compounds of the formulae I and the compounds of the formulae IIA and/or IIB and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^9\text{-L-G-E-}R^{10} \quad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH=CH— | —N(O)=N— |
|---|---|---|
| | —CH=CQ— | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO-Phe-COO— |
| | —CF$_2$O— | —CF=CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and R$^9$ and R$^{10}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, R$^9$ and R$^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PALC mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2%, based on the mixture. Mixtures of this type can be used for so-called polymer-stabilised VA modes, in which polymerisation of the reactive mesogens is intended to take place in the liquid-crystalline mixture. The prerequisite for this is that the liquid-crystal mixture does not itself comprise any polymerisable components.

The construction of the liquid-crystal displays according to the invention corresponds to the usual geometry, as described, for example, in EP-A 0 240 379.

The following examples are intended to explain the invention without limiting it. Above and below, per cent data denote per cent by weight; all temperatures are indicated in degrees Celsius.

Besides the compounds of the formulae IIA and/or IIB and one or more compounds from the group of the compounds of the formulae IB, IC and ID, the mixtures according to the invention preferably comprise one or more of the compounds indicated below.

The following abbreviations are used:

(n, m, z: each, independently of one another, 1, 2, 3, 4, 5 or 6)

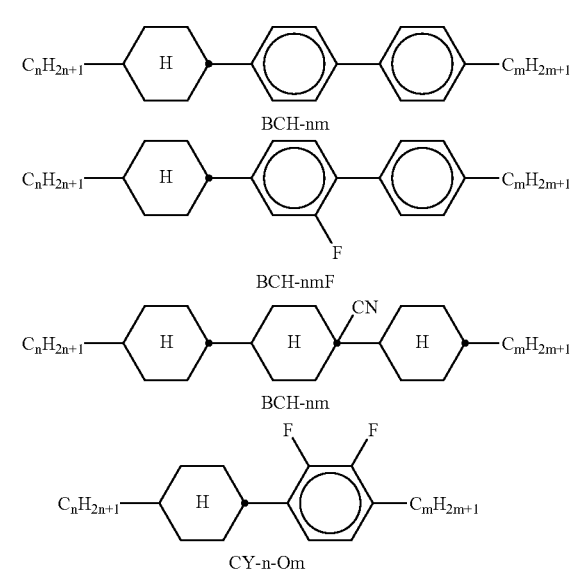

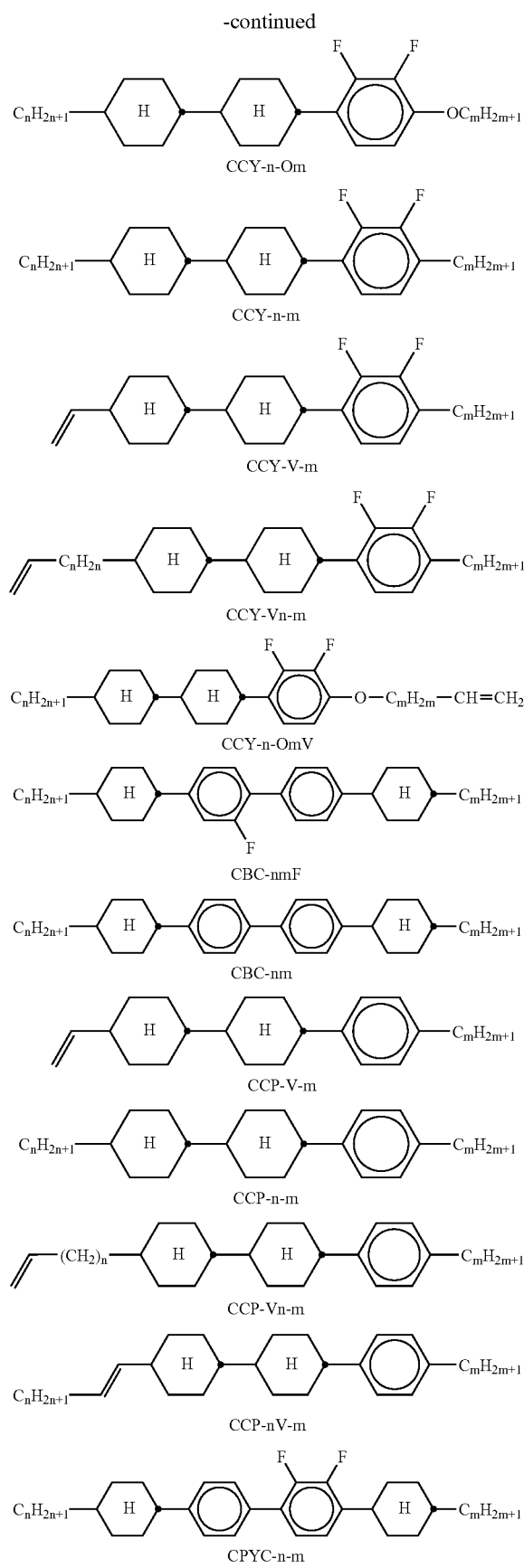
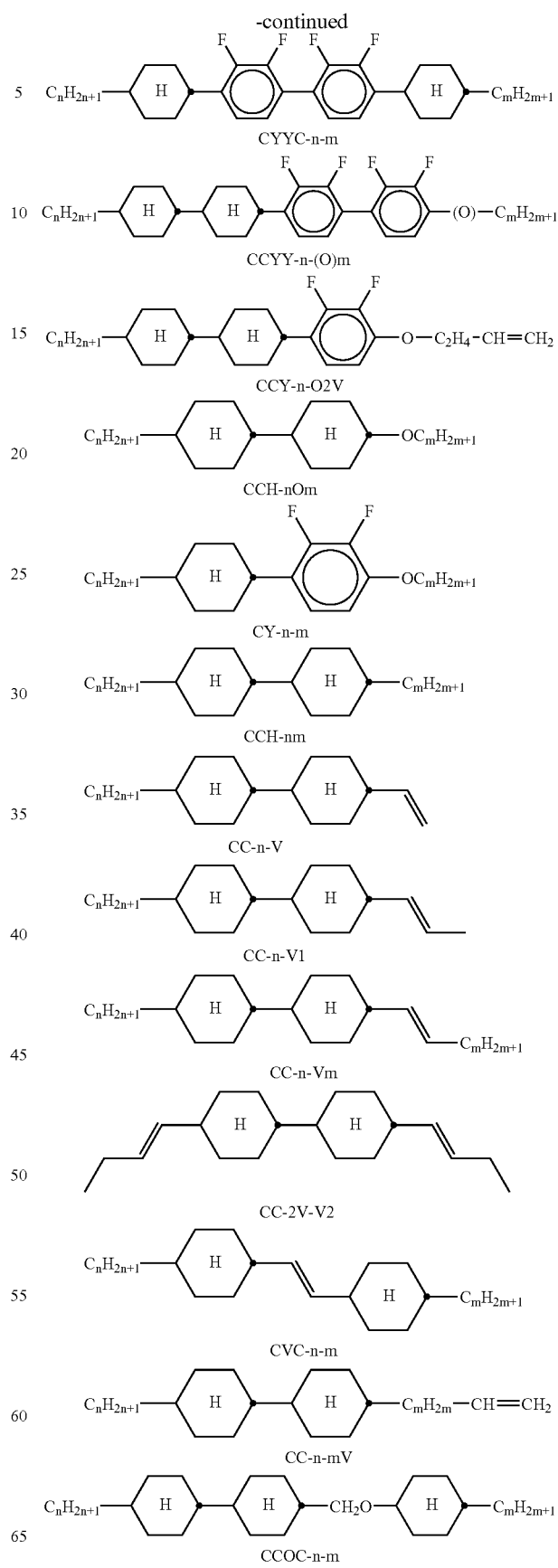

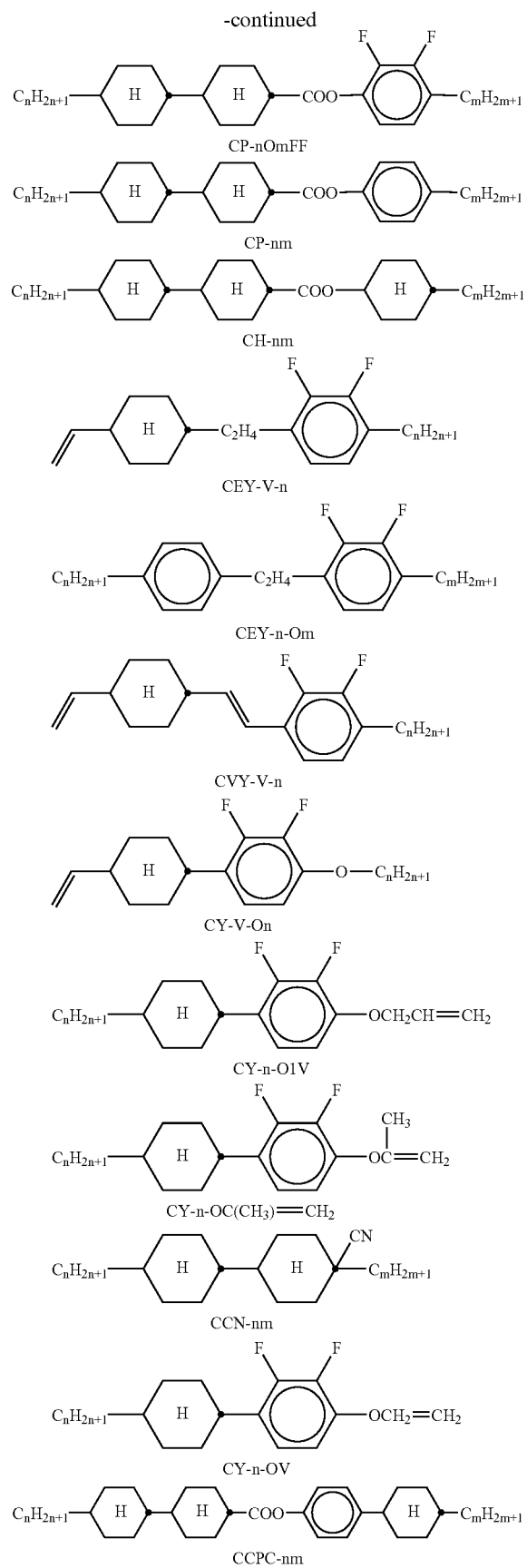
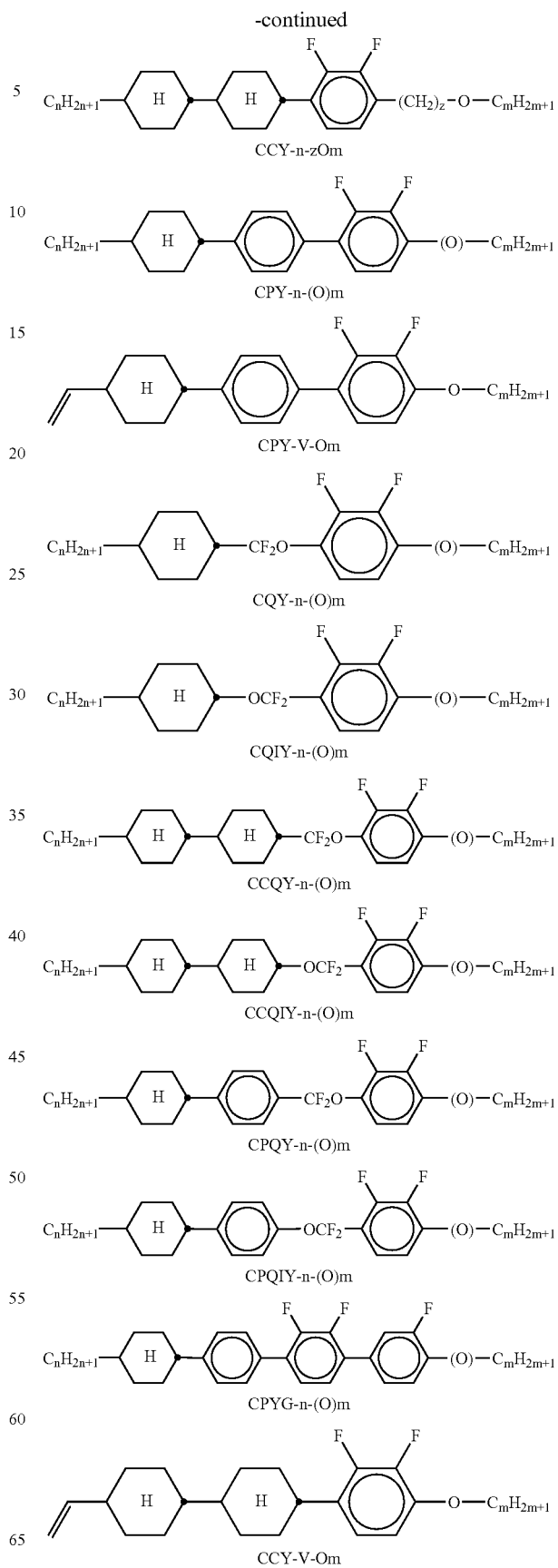

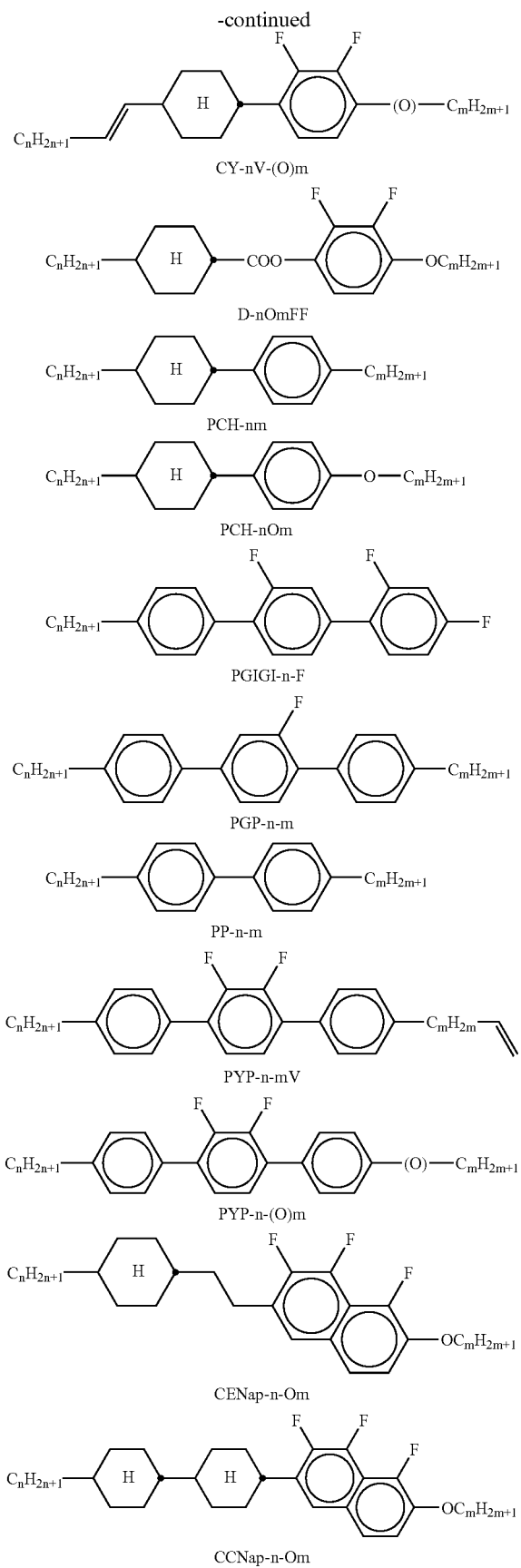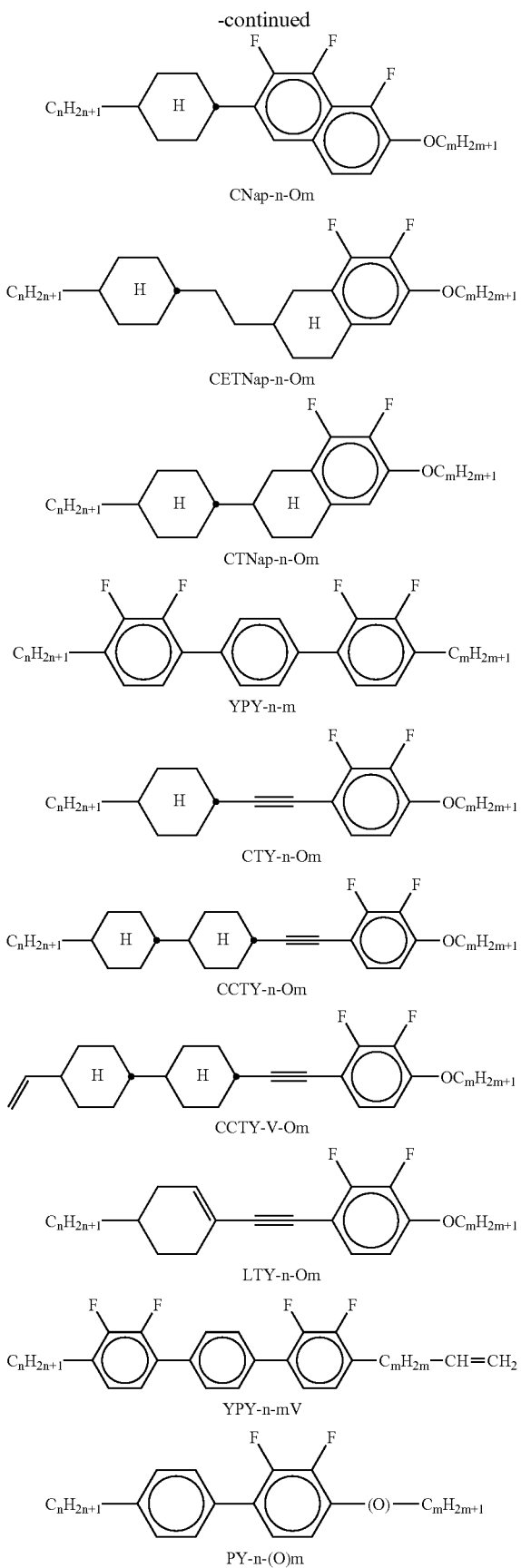

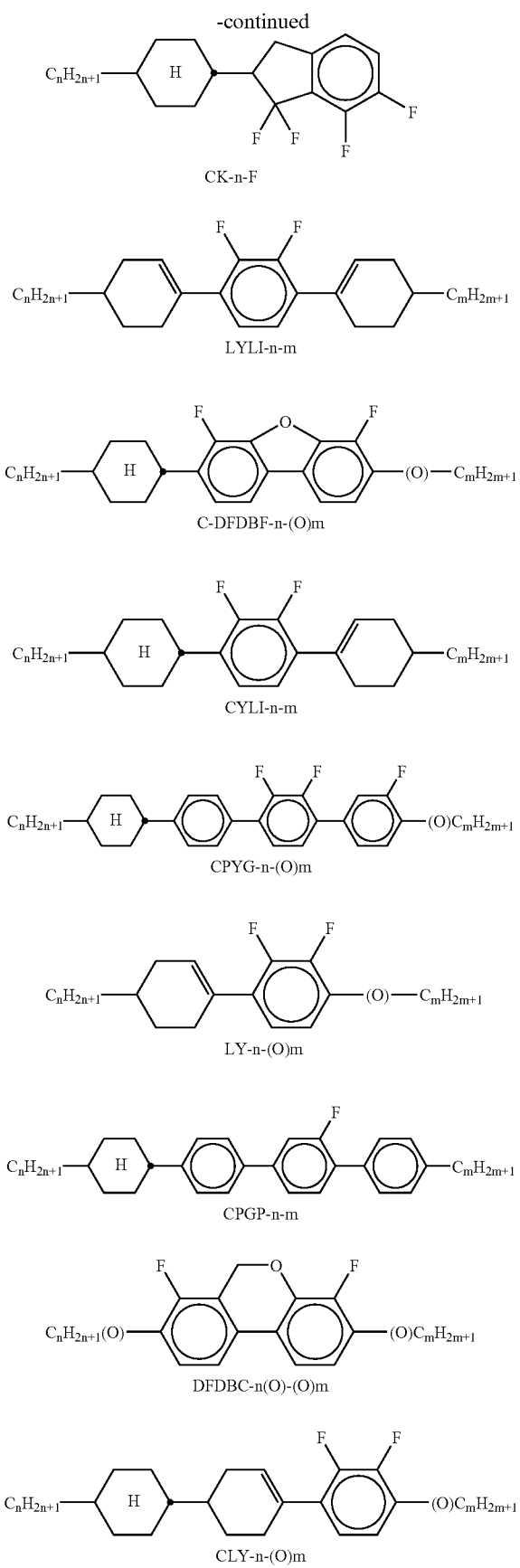

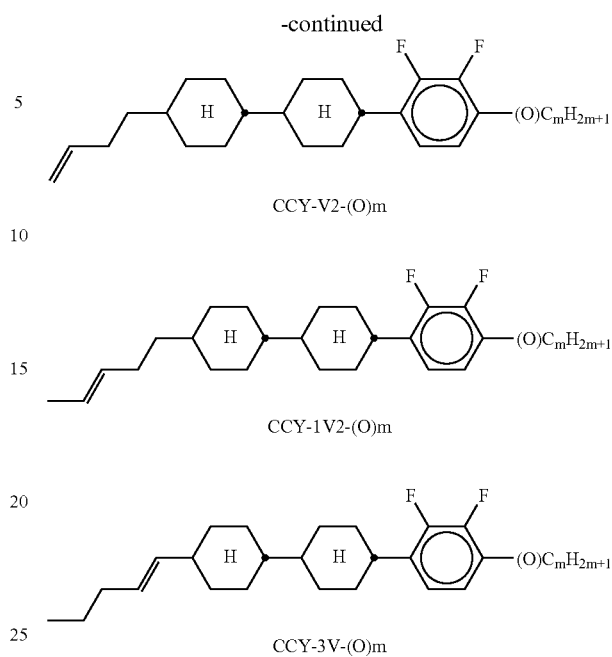

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of 0.01-4% by weight, preferably 0.1-1.0% by weight.

TABLE A
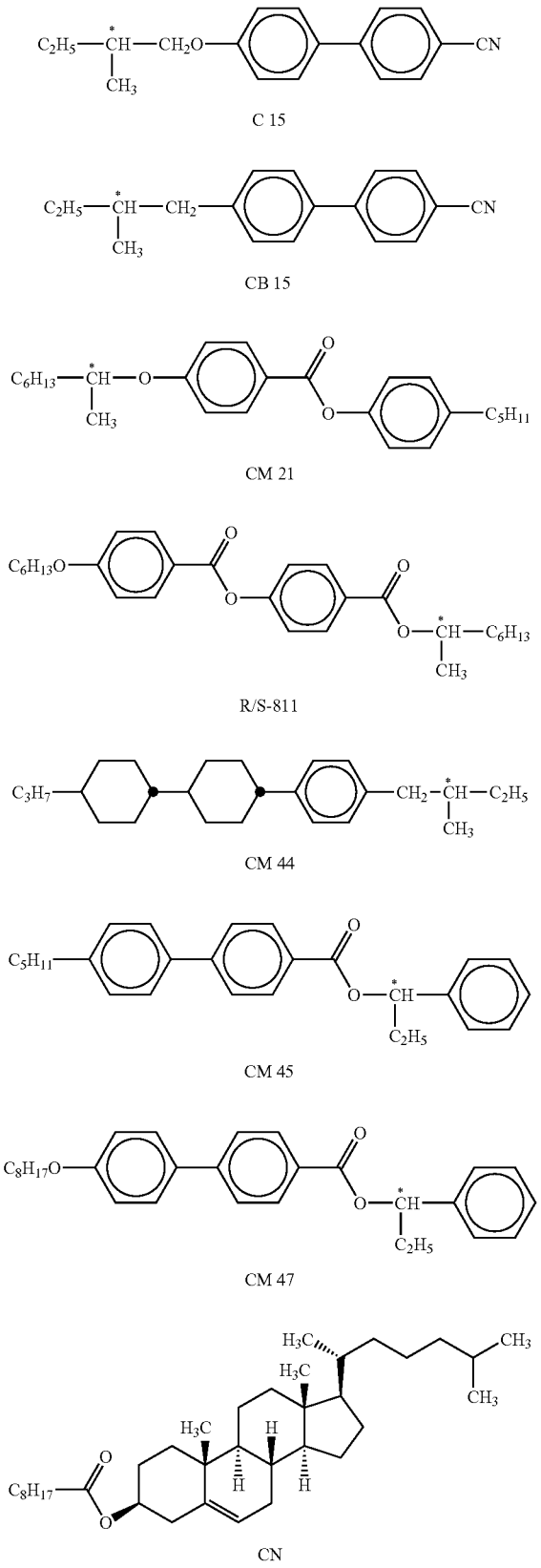

TABLE A-continued
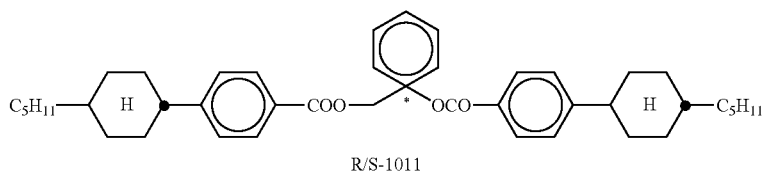
R/S-1011
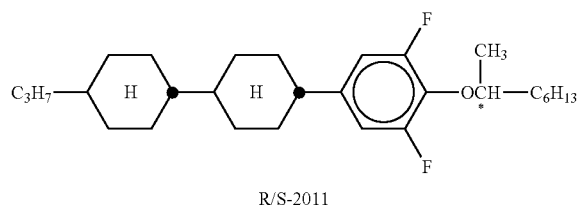
R/S-2011
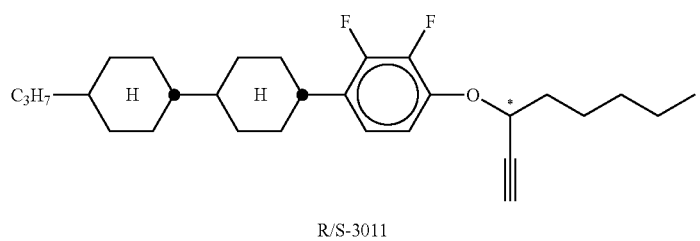
R/S-3011
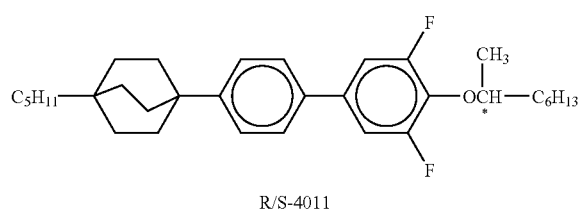
R/S-4011
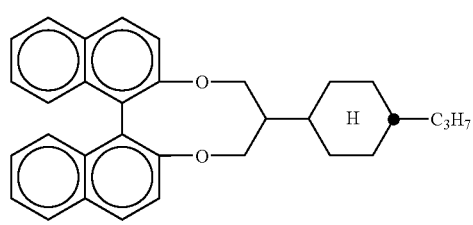
R/S-5011
Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table B.
TABLE B
(n = 1-12)
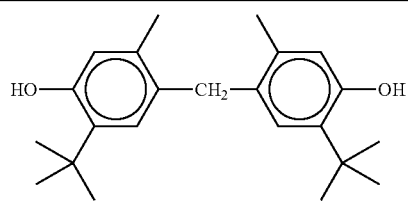 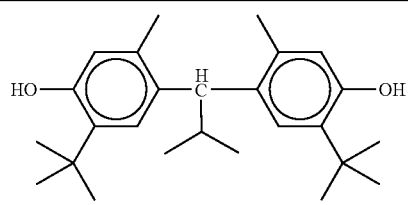

TABLE B-continued
(n = 1-12)
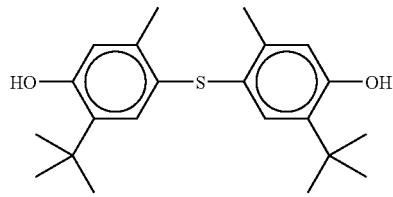
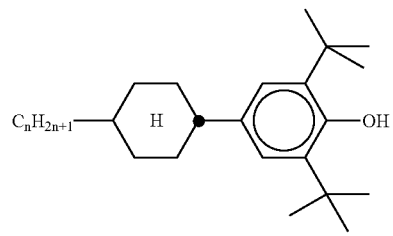
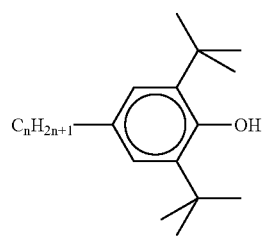
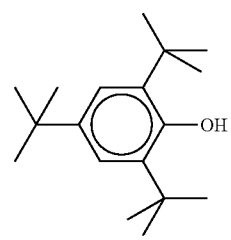
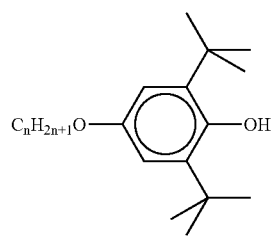
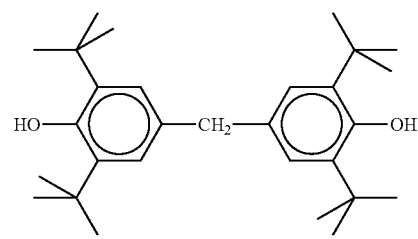
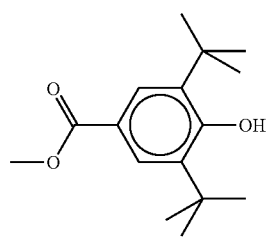
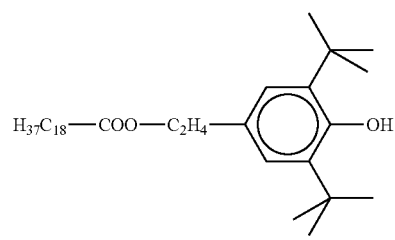
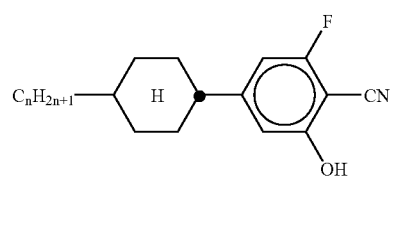
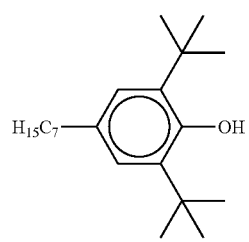

TABLE B-continued
(n = 1-12)
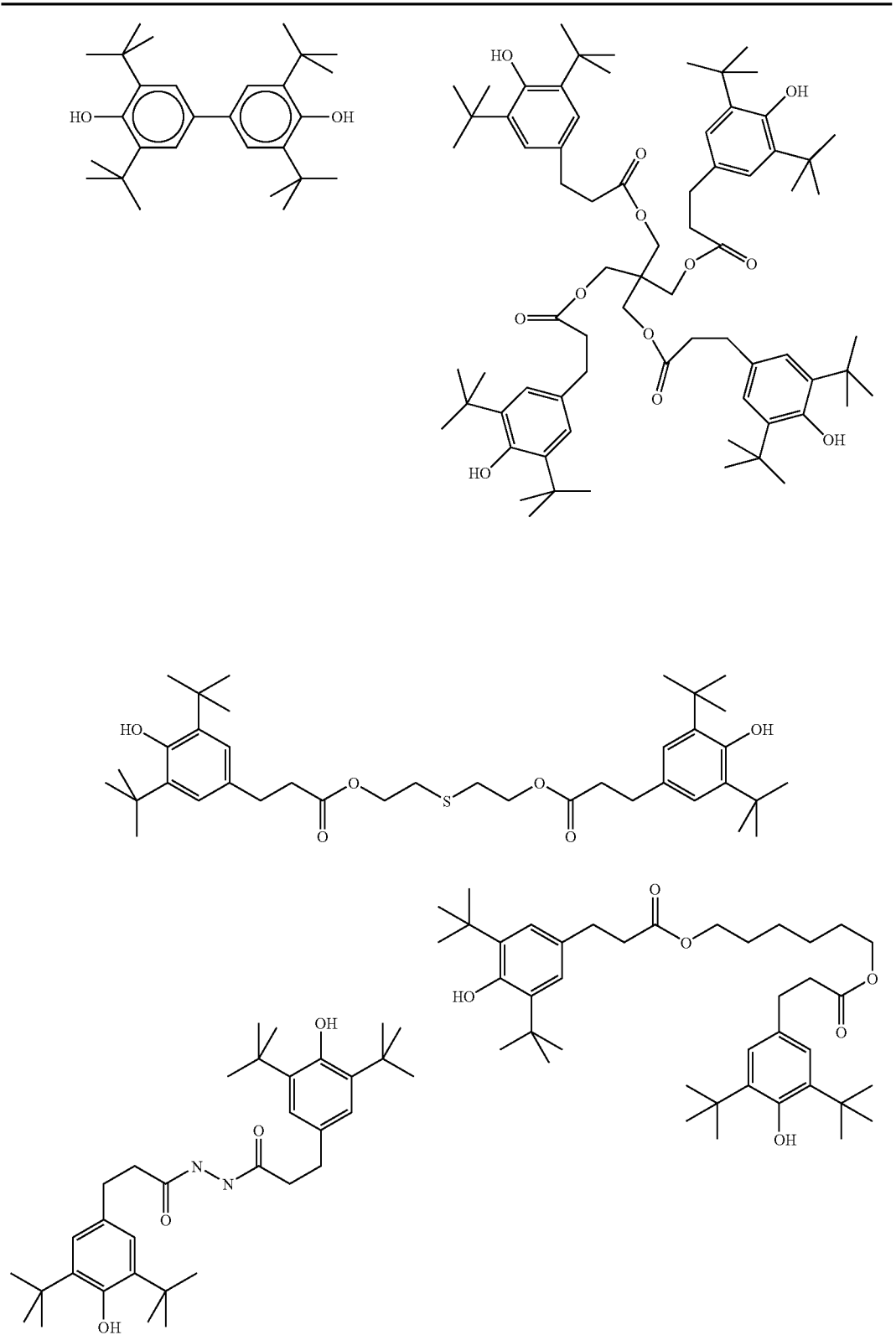

TABLE B-continued
(n = 1-12)
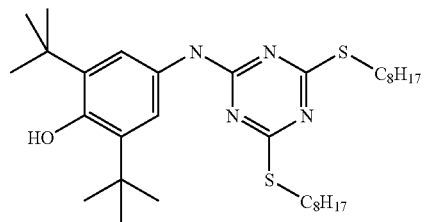
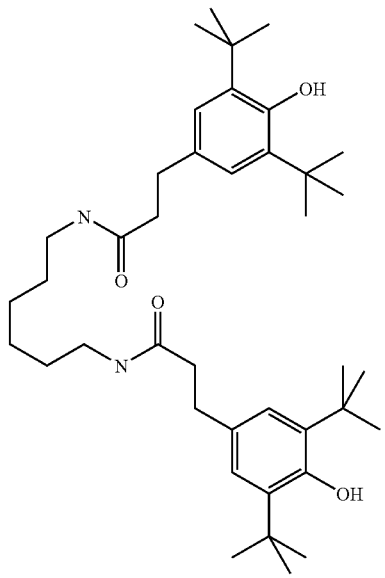
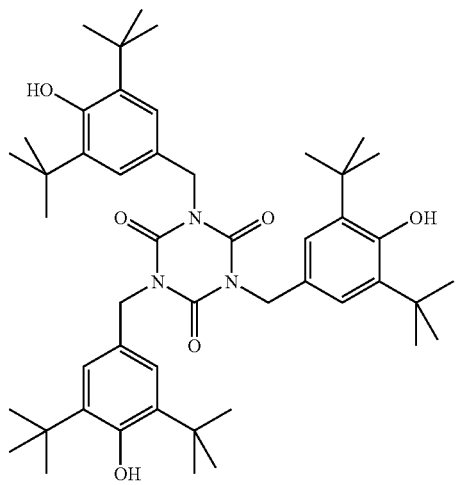
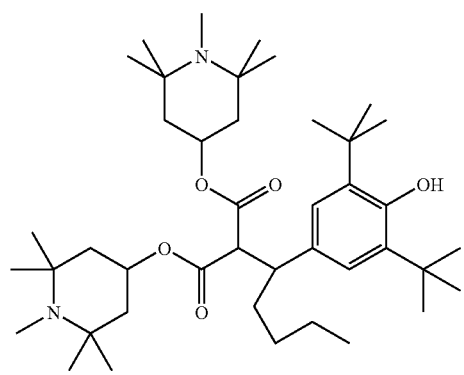
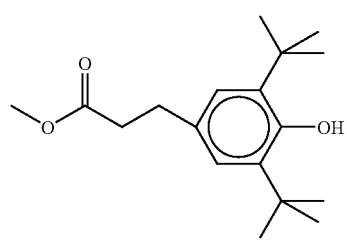
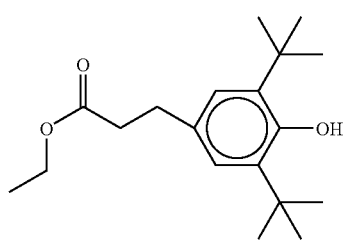
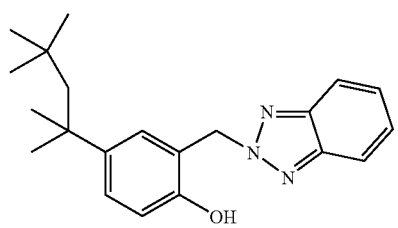
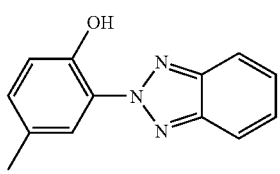

TABLE B-continued
(n = 1-12)
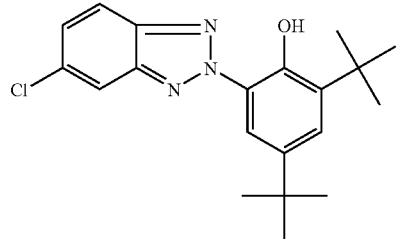 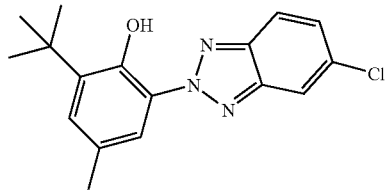
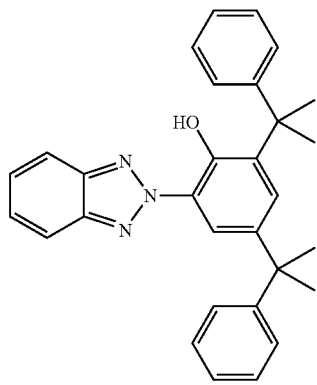 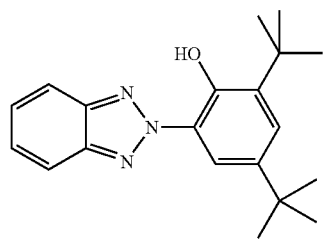
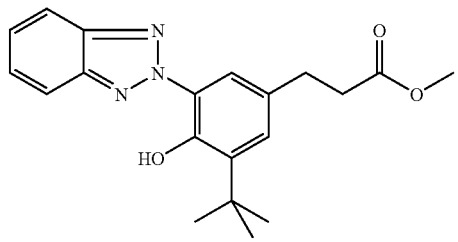 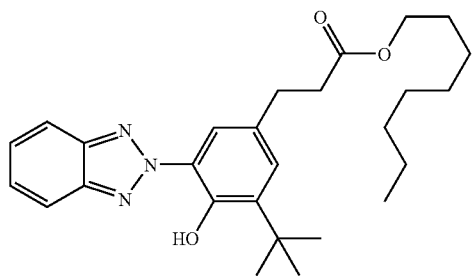
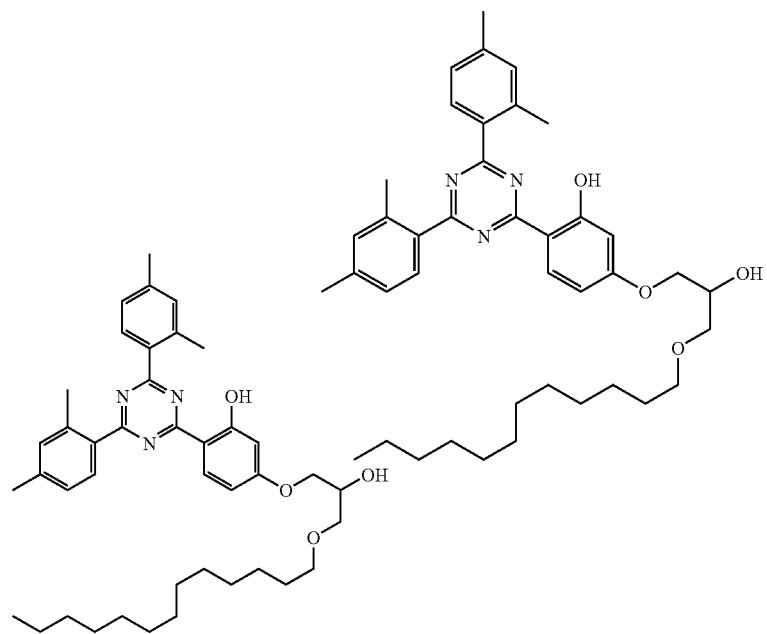

TABLE B-continued (n = 1-12)

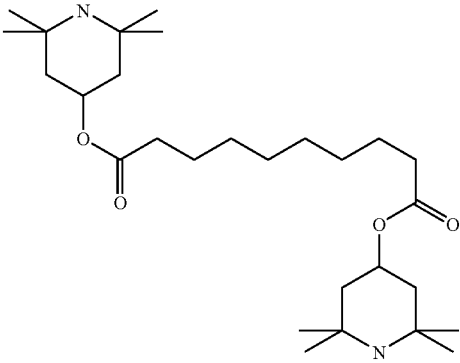
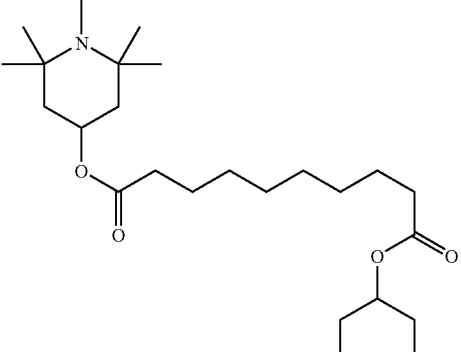

The following examples are intended to explain the invention without limiting it. Above and below,

| | |
|---|---|
| $V_0$ | denotes the threshold voltage, capacitive [V] at 20° C. |
| Δn | denotes the optical anisotropy measured at 20° C. and 589 nm |
| Δε | denotes the dielectric anisotropy at 20° C. and 1 kHz |
| cl.p. | denotes the clearing point [° C.] |
| $K_1$ | denotes the elastic constant, "splay" deformation at 20° C. [pN] |
| $K_3$ | denotes the elastic constant, "bend" deformation at 20° C. [pN] |
| $γ_1$ | denotes the rotational viscosity measured at 20° C. [mPa · s], determined by the rotation method in a magnetic field |
| LTS | denotes the low-temperature stability (nematic phase), determined in test cells |
| HR (20) | denotes the voltage holding ratio at 20° C. [%] |
| HR (100) | denotes the voltage holding ratio after 5 min. at 100° C. [%] |
| HR (UV) | denotes the voltage holding ratio after UV exposure [%] |

The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

All per cent data in this application are, unless indicated otherwise, per cent by weight. All concentrations in this application, unless explicitly indicated otherwise, relate to the corresponding mixture or mixture component.

MIXTURE EXAMPLES

Example 1

| | | | |
|---|---|---|---|
| CY-3-O2 | 20.0% | Clearing point [° C.]: | 80.5 |
| CY-5-O2 | 5.0% | Δn [589 nm, 20° C.]: | 0.0942 |
| CCY-3-O2 | 12.0% | $ε_∥$ [1 kHz, 20° C.]: | 3.8 |
| CCY-3-O3 | 12.0% | $ε_⊥$ [1 kHz, 20° C.]: | 8.2 |
| CCTY-3-O2 | 12.0% | Δε [1 kHz, 20° C.] | −4.4 |
| CTY-3-O2 | 10.0% | $K_1$ [pN, 20° C.] | 13.1 |
| CC-4-V | 23.0% | $K_3$ [pN, 20° C.] | 15.6 |
| CC-3-V1 | 6.0% | $K_3/K_1$ | 1.19 |
| | | $V_0$ [V, 20° C.] | 1.99 |
| | | $γ_1$ [mPa · s, 20° C.]: | 134 |
| | | LTS cell    −20° C.: | >1000 h |
| | |             −30° C. | >1000 h |
| | |             −40° C. | >1000 h |

Example 2

| | | | |
|---|---|---|---|
| CCY-3-O3 | 7.0% | Clearing point [° C.]: | 104.5 |
| CCY-4-O2 | 6.0% | Δn [589 nm, 20° C.]: | 0.0985 |
| CCY-5-O2 | 6.0% | Δε [1 kHz, 20° C.] | −2.8 |
| PYP-2-4 | 2.0% | $V_0$ [V, 20° C.] | 2.80 |
| CCP-V-1 | 14.0% | $γ_1$ [mPa · s, 20° C.]: | 139 |
| CCP-V2-1 | 12.0% | | |
| CC-3-V1 | 15.0% | | |
| CC-4-V | 10.0% | | |
| CK-3-F | 4.0% | | |
| CK-4-F | 5.0% | | |
| CK-5-F | 4.0% | | |
| CTY-3-O2 | 10.0% | | |
| CTY-3-O4 | 5.0% | | |

Example 3

| | | | |
|---|---|---|---|
| CY-3-O4 | 20.0% | Clearing point [° C.]: | 80.5 |
| CY-5-O4 | 8.0% | Δn [589 nm, 20° C.]: | 0.0970 |
| CCY-3-O3 | 5.0% | Δε [1 kHz, 20° C.] | −3.0 |
| CPY-2-O2 | 4.0% | $γ_1$ [mPa · s, 20° C.]: | 124 |
| CPY-3-O2 | 6.0% | | |
| CC-3-V1 | 10.0% | | |
| CCP-V-1 | 12.0% | | |
| CCP-V2-1 | 12.0% | | |
| CCH-34 | 11.0% | | |
| CTY-3-O2 | 6.0% | | |
| CTY-5-O2 | 6.0% | | |

Example 4

| | | | |
|---|---|---|---|
| CY-3-O4 | 8.0% | Clearing point [° C.]: | 90.5 |
| CCY-3-O2 | 8.0% | Δn [589 nm, 20° C.]: | 0.1305 |
| CCY-3-O3 | 5.0% | Δε [1 kHz, 20° C.] | −3.9 |
| CCY-4-O2 | 5.0% | V₀ [V, 20° C.] | 2.10 |
| CPY-2-O2 | 5.0% | γ₁ [mPa · s, 20° C.]: | 229 |
| CPY-3-O2 | 5.0% | | |
| PYP-2-3 | 6.0% | | |
| PYP-2-4 | 6.0% | | |
| PCH-53 | 9.0% | | |
| CC-3-V | 10.0% | | |
| CCP-V-1 | 4.0% | | |
| CTY-3-O2 | 10.0% | | |
| CTY-5-O2 | 5.0% | | |
| LTY-3-O2 | 4.0% | | |
| CCTY-3-O2 | 10.0% | | |

Example 5

| | | | |
|---|---|---|---|
| CY-3-O2 | 25.0% | Clearing point [° C.]: | 72.0 |
| CCY-3-O3 | 12.0% | Δn [589 nm, 20° C.]: | 0.1054 |
| CPY-2-O2 | 12.0% | Δε [1 kHz, 20° C.] | −4.2 |
| CCTY-V-O2 | 12.0% | V₀ [V, 20° C.] | 2.05 |
| LTY-2-O2 | 10.0% | γ₁ [mPa · s, 20° C.]: | 110 |
| CC-3-V | 29.0% | | |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102007041246.2, filed Aug. 30, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium based on a mixture of polar compounds, comprising A) at least one compound of formula I

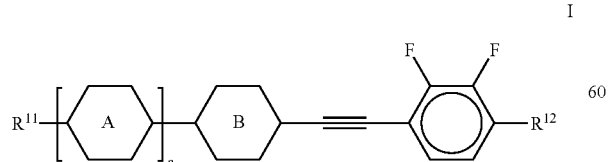

in which

R¹¹ and R¹² each, independently of one another, denote an alkyl or alkenyl radical having up to 15 C atoms which is unsubstituted, monosubstituted by CN or CF₃ or at least monosubstituted by halogen, in which one or more CH₂ groups are optionally replaced by —O—, —S—,

—C≡C—, —CF₂O—, —OC—O— or —O—CO— in such a way that O atoms are not linked directly to one another,

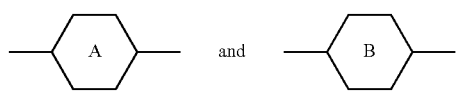

each, independently of one another, denote

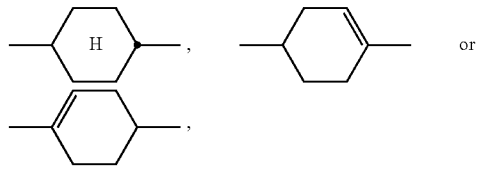

a denotes 0, 1 or 2, and

B1) one or more compounds of formulae IIA and/or IIB

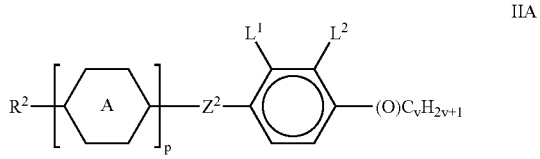

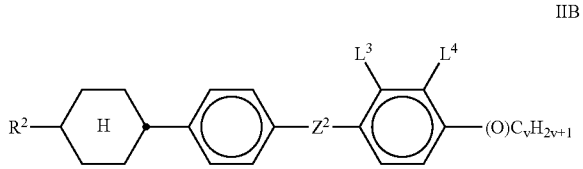

in which

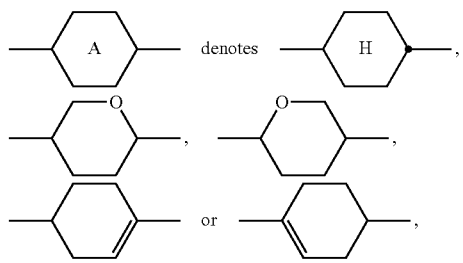

R² denotes an alkyl or alkenyl radical having up to 15 C atoms which is unsubstituted, monosubstituted by CN or CF₃ or at least monosubstituted by halogen, in which one or more CH₂ groups are optionally replaced by —O—, —S—,

—C≡C—, —CF₂O—, —OC—O— or —O—CO— in such a way that O atoms are not linked directly to one another, Z² denotes a single bond, —CH=CH—, —CH₂O—, —OCH₂—, —CF₂O—, —OCF₂—, —O—, —CH₂— or —CH₂CH₂—, p denotes 1 or 2, L¹, L², L³ and L⁴ each, independently of one another, denote F, Cl, OCF₃, CF₃, CH₃, CH₂F, or CHF₂, and v denotes 1 to 6, or B2) one or more compounds of formula III $$R^{31}-A^{31}-[Z^{31}-A^{32}]_r-Z^{32}-A^{33}-R^{32} \quad \text{III}$$

in which

R³¹ and R³² each, independently of one another, denote an alkyl or alkenyl radical having up to 15 C atoms which is unsubstituted, monosubstituted by CN or CF₃ or at least monosubstituted by halogen, in which one or more CH₂ groups are optionally replaced by —O—, —S—,

—C≡C—, —OC—O— or —O—CO— in such a way that O atoms are not linked directly to one another,

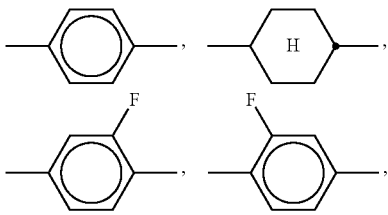

each, independently of one another, denote

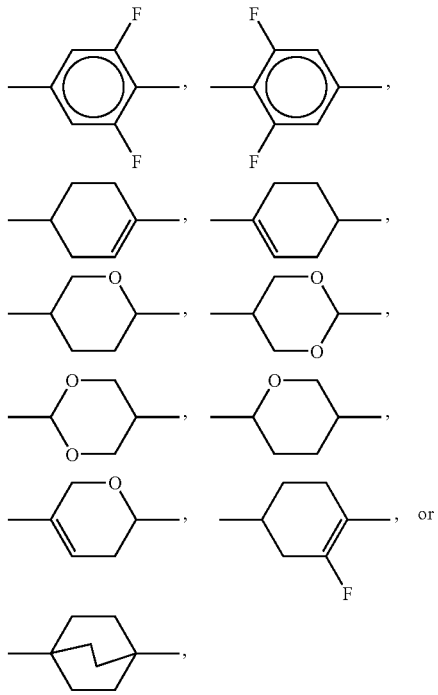

r denotes 0, 1 or 2, and

Z³¹ and Z³² each, independently of one another, denote a single bond, —CH₂CH₂—, —C≡C—, —CH=CH—, —CF₂O—, —OCF₂—, —CF=CF—, —CF=CH—, —CH=CF—, —CH₂CF₂—, —CF₂CH₂—, —COO—, —OCO—, —CH₂O—, —OCH₂—, or —(CH₂)₄—.

2. A liquid-crystalline medium according to claim 1, which comprises two, three, four or more compounds of formula I.

3. A liquid-crystalline medium according to claim 1, wherein the proportion of compounds of formula I in the mixture as a whole is at least 2% by weight.

4. A liquid-crystalline medium according to claim 1, wherein the proportion of compounds of formulae IIA and/or IIB in the mixture as a whole is at least 20% by weight.

5. A liquid-crystalline medium according to claim 1, wherein the proportion of compounds of formula III in the mixture as a whole is at least 5% by weight.

6. A liquid-crystalline medium according to claim 1, which comprises at least one compound of formulae I1 to I24:

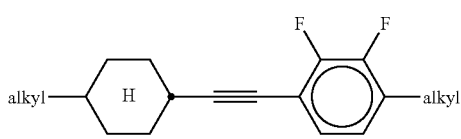

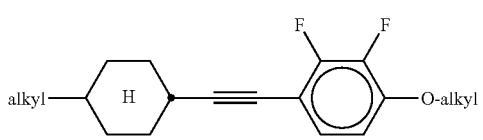

-continued
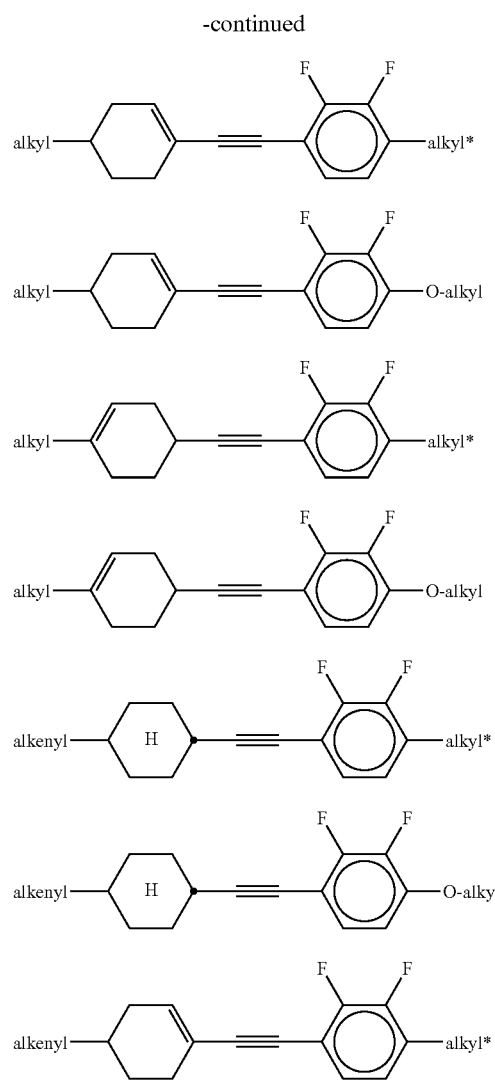
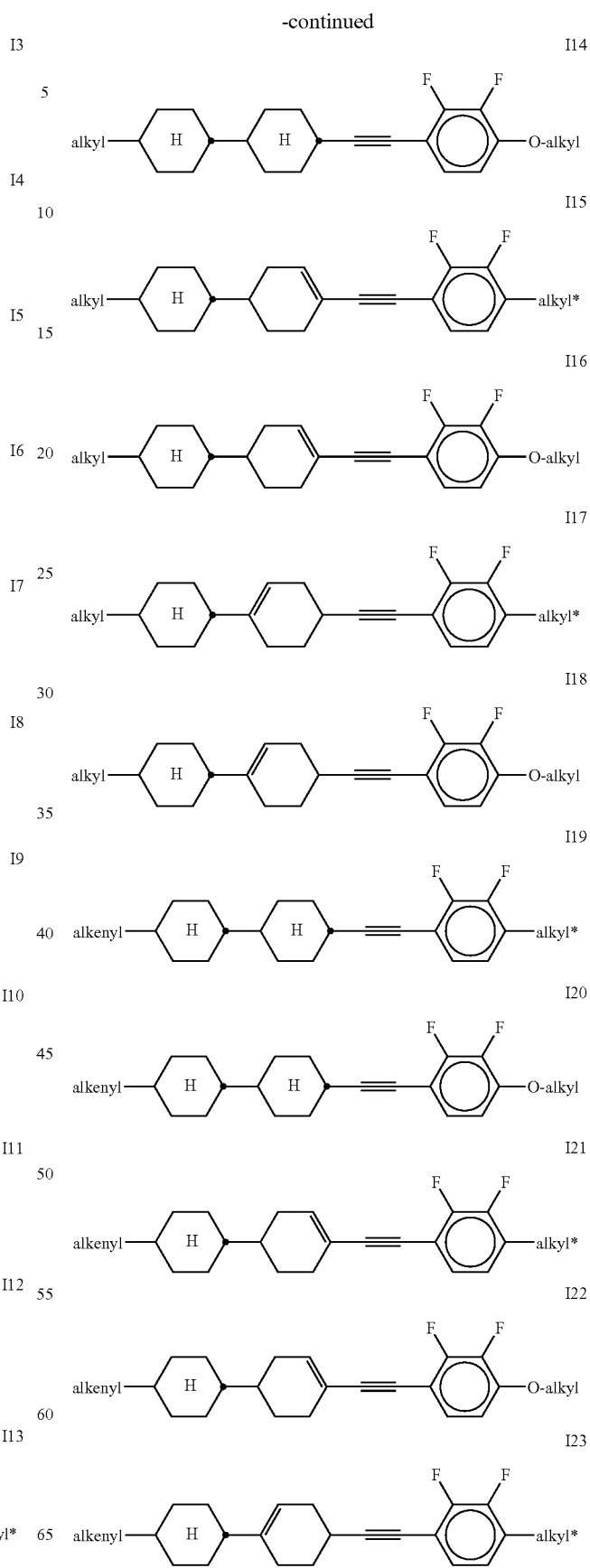

-continued

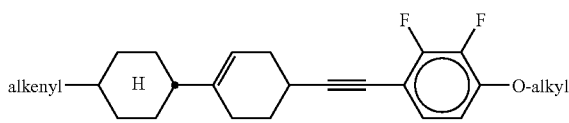
I24 in which
alkyl and alkyl* each, independently of one another, denote a straight-chain alkyl radical having 1-6 C atoms, and alkenyl denotes a straight-chain alkenyl radical having 2-6 C atoms.

7. A liquid-crystalline medium according to claim 1, wherein $L^1$, $L^2$, $L^3$ and $L^4$ each denote fluorine.

8. A liquid-crystalline medium according to claim 1, which comprises or consists of
2-60% by weight of one or more compounds of formula I, and 20-80% by weight of one or more compounds of formulae IIA and/or IIB,
where the total concentration is max. 100%, based on the mixture.

9. A process for preparing a liquid-crystalline medium according to claim 1, comprising mixing together one or more compounds of formula I with one or more mesogenic compounds, and optionally with one or more additives and/or stabilisers.

10. An electro-optical display comprising a liquid-crystalline medium according to claim 1.

11. An electro-optical display having passive-matrix addressing or active-matrix addressing based on the ECB, PALC, FFS or IPS effect, comprising, as dielectric, a liquid-crystalline medium according to claim 1.

12. A liquid-crystalline medium according to claim 6, which comprises at least one compound of formulae I1 to I12, I15 to I24.

13. A liquid-crystalline medium according to claim 6, which comprises at least one compound of formulae I1 to I12, I15 to I18, I21 to I24.

14. A liquid-crystalline medium according to claim 1, which a $\Delta\epsilon$ of −1.5 or less.

15. A liquid-crystalline medium according to claim 1, which a $\Delta\epsilon$ of −3.0 or less.

16. A liquid-crystalline medium based on a mixture of polar compounds, comprising at least one compound of formula I

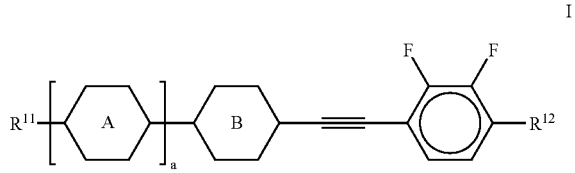
I in which
$R^{11}$ and $R^{12}$ each, independently of one another, denote an alkyl or alkenyl radical having up to 15 C atoms which is unsubstituted, monosubstituted by CN or $CF_3$ or at least monosubstituted by halogen, in which one or more $CH_2$ groups are optionally replaced by —O—, —S—,

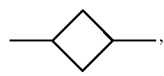

—C≡C—, —$CF_2$O—, —OC—O— or —O—CO— in such a way that O atoms are not linked directly to one another,

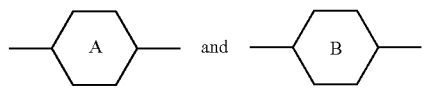

each, independently of one another, denote

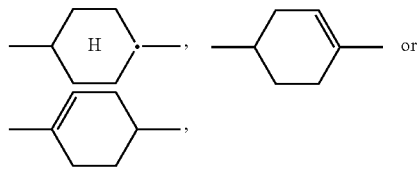

a denotes 0, 1 or 2,
with the proviso that the compound of formula I is not selected from 4-{2-[trans-4-(trans-4-ethyl cyclohexyl)cyclohexyl]ethynyl}2,3-difluoro anisole;
4-{2-[trans-4-(trans-4-n-propyl cyclohexyl)cyclohexyl]ethynyl}2,3-difluoro anisole;
4-{2-[trans-4-(trans-4-n-butyl cyclohexyl)cyclohexyl]ethynyl}2,3-difluoro anisole;
4-{2-[trans-4-(trans-4-n-pentyl cyclohexyl)cyclohexyl]ethynyl}2,3-difluoro anisole;
4-{2-[trans-4-(trans-4-n-heptyl cyclohexyl)cyclohexyl]ethynyl}2,3-difluoro anisole;
4-{2-[trans-4-(trans-4-ethyl cyclohexyl)cyclohexyl]ethynyl}2,3-difluoro phenetole;
4-{2-[trans-4-(trans-4-n-propyl cyclohexyl)cyclohexyl]ethynyl}2,3-difluoro phenetole;
4-{2-[trans-4-(trans-4-n-butyl cyclohexyl)cyclohexyl]ethynyl}2,3-difluoro phenetole;
4-{2-[trans-4-(trans-4-n-pentyl cyclohexyl)cyclohexyl]ethynyl}2,3-difluoro phenetole;
4-{2-[trans-4-(trans-4-n-heptyl cyclohexyl)cyclohexyl]ethynyl}2,3-difluoro phenetole;
4-{2-[trans-4-(trans-4-ethyl cyclohexyl)cyclohexyl]ethynyl}2,3-dfluoro toluene;
4-{2-[trans-4-(trans-4-n-propyl cyclohexyl)cyclohexyl]ethynyl}2,3-difluoro toluene;
4-{2-[trans-4-(trans-4-n-butyl cyclohexyl)cyclohexyl]ethynyl}2,3-difluoro toluene;
4-{2-[trans-4-(trans-4-n-pentyl cyclohexyl)cyclohexyl]ethynyl}2,3-difluoro toluene;
4-{2-[trans-4-(trans-4-n-heptyl cyclohexyl)cyclohexyl]ethynyl}2,3-difluoro toluene;
4-{2-[trans-4-(trans-4-ethyl cyclohexyl)cyclohexyl]ethynyl}2,3-difluoro ethylbenzene;
4-{2-[trans-4-(trans-4-n-propyl cyclohexyl)cyclohexyl]ethynyl}2,3-difluoro ethylbenzene;
4-{2-[trans-4-(trans-4-n-butyl cyclohexyl)cyclohexyl]ethynyl}2, 3-difluoro ethylbenzene;
4-{2-[trans-4-(trans-4-n-pentyl cyclohexyl)cyclohexyl]ethynyl}2,3-difluoro ethylbenzene; and
4-{2-[trans-4-(trans-4-n-heptyl cyclohexyl)cyclohexyl]ethnyl}2,3-difluoro ethylbenzene;

and further comprising
one or more compounds of formulae IIA and/or IIB

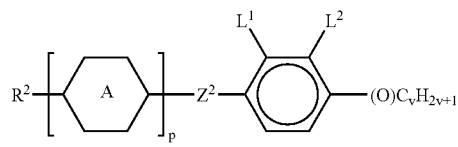 IIA

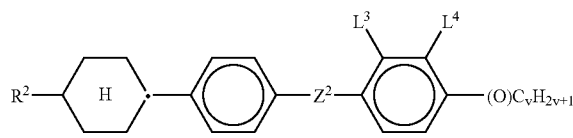 IIB in which

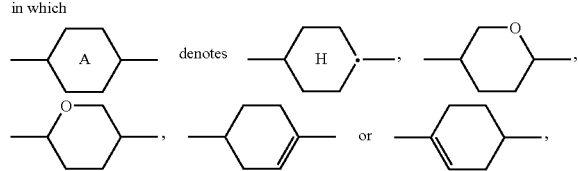

A denotes

R² denotes an alkyl or alkenyl radical having up to 15 C atoms which is unsubstituted, monosubstituted by CN or $CF_3$ or at least monosubstituted by halogen, in which one or more $CH_2$ groups are optionally replaced by —O—, —S—,

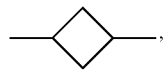

—C≡C—, —$CF_2$O—, —OC—O— or —O—CO— in such a way that O atoms are not linked directly to one another, Z² denotes a single bond, —CH=CH—, —$Ch_2$O—, —$OCH_2$—, —$CF_2$O—, —$OCF_2$—, —O—, —$Ch_2$— or —$CH_2CH_2$—, p denotes 1 or 2, L¹, L², L³ and L⁴ each, independently of one another, denote F, Cl, $OCF_3$, $CF_3$, $CH_3$, $CH_2F$, or $CHF_2$, and v denotes 1 to 6, or one or more compounds of formula III

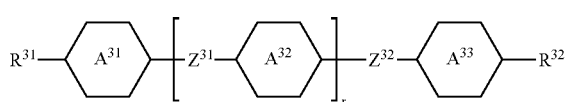 III in which $R^{31}$ and $R^{32}$ each, independently of one another, denote an alkyl or alkenyl radical having up to 15 C atoms which is unsubstituted, monosubstituted by CN or $CF_3$ or at least monosubstituted by halogen, in which one or more $CH_2$ groups are optionally replaced by —O—, —S—,

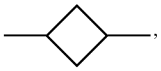

—C≡C—, —OC—O— or —O—CO— in such a way that O atoms are not linked directly to one another,

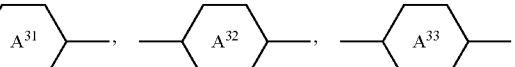

each, independently of one another, denote

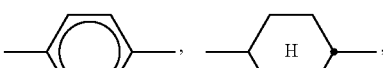

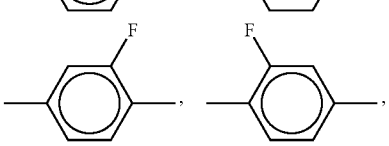

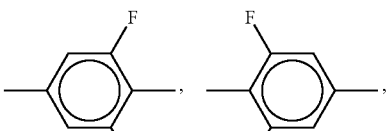

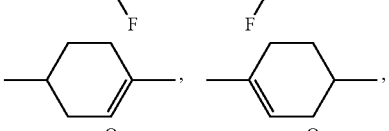

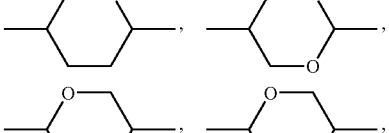

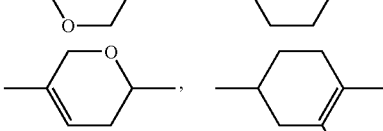, or

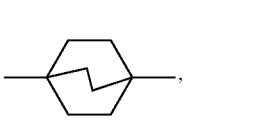

r denotes 0, 1 or 2, and $Z^{31}$ and $Z^{32}$ each, independently of one another, denote a single bond, —$CH_2CH_2$—, —C≡C—, —CH=CH—, —$CF_2$O—, —$OCF_2$—, —CF=CF—, —CF=CH—, —CH=CF—, —$CH_2CF_2$—, —$CF_2CH_2$—, —COO—, —OCO—, —$CH_2$O—, —$OCH_2$—, or —$(CH_2)_4$—.

17. A liquid-crystalline medium based on a mixture of polar compounds, comprising at least one compound of formula I

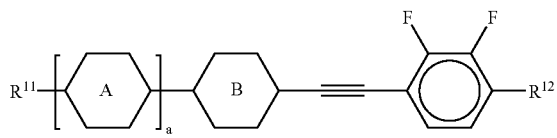

I in which

R$^{11}$ and R$^{12}$ each, independently of one another, denote an alkyl or alkenyl radical having up to 15 C atoms which is unsubstituted, monosubstituted by CN or CF$_3$ or at least monosubstituted by halogen, in which one or more CH$_2$ groups are optionally replaced by —O—, —S—,

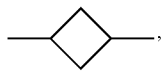

—C≡C—, —CF$_2$O—, —OC—O— or —O—CO— in such a way that O atoms are not linked directly to one another,

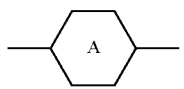

each, independently of one another, denote

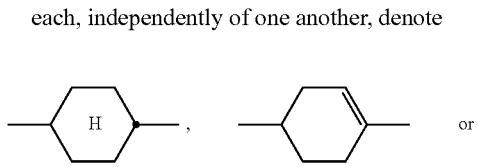

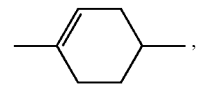

a denotes 0, 1 or 2,
compounds represented by formula IE:

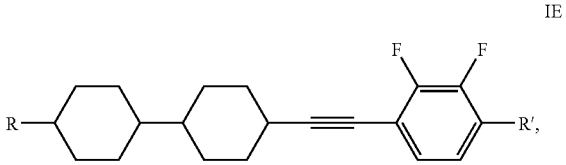

in which
R denotes straight chain alkyl group having 1-9 carbon atoms, and
R' denotes alkyl or alkoxy having 1-3 carbon atoms.

18. A liquid-crystalline medium according to claim 16, wherein
R$^{12}$ denotes an alkyl or alkenyl radical having up to 15 C atoms which is unsubstituted, monosubstituted by CN or CF$_3$ or at least monosubstituted by halogen, in which one or more CH$_2$ groups are optionally replaced by —S—,

—C≡C—, —CF$_2$O—, —OC—O— in such a way that O atoms are not linked directly to one another.

* * * * *

UNITED STATES PATENT AND TRADEMARK OFFICE
CERTIFICATE OF CORRECTION

PATENT NO. : 7,854,970 B2  
APPLICATION NO. : 12/202764  
DATED : December 21, 2010  
INVENTOR(S) : Melanie Klasen-Memmer Page 1 of 1

It is certified that error appears in the above-identified patent and that said Letters Patent is hereby corrected as shown below:

Column 64, line 37 claim 1 reads: "-Ch$_2$CF$_2$-, -CF$_2$CH$_2$-, -COO-, -OCO-,"

Should read: -- -CH$_2$CF$_2$-, -CF$_2$CH$_2$-, -COO-, -OCO-, --

Column 64, line 38 claim 1 reads: "-Ch$_2$O-, -OCH$_2$-, or -(CH$_2$)$_4$-."

Should read: -- -CH$_2$O-, -OCH$_2$-, or -(CH$_2$)$_4$-. --

Signed and Sealed this  
Third Day of May, 2011

David J. Kappos  
*Director of the United States Patent and Trademark Office*